US011760079B2

(12) United States Patent
Yang et al.

(10) Patent No.: US 11,760,079 B2
(45) Date of Patent: Sep. 19, 2023

(54) PEELING APPARATUS AND METHOD OF MANUFACTURING DISPLAY DEVICE USING THE SAME

(71) Applicant: Samsung Display Co., LTD., Yongin-si (KR)

(72) Inventors: Dae Ho Yang, Asan-si (KR); Sun Kwan Kim, Cheonan-si (KR); Jin Woo Park, Asan-si (KR); Sung Hoon Lee, Cheonan-si (KR); Won Ho Lee, Cheonan-si (KR); IL Soo Jang, Suwon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 143 days.

(21) Appl. No.: 17/127,053

(22) Filed: Dec. 18, 2020

(65) Prior Publication Data

US 2021/0187932 A1    Jun. 24, 2021

(30) Foreign Application Priority Data

Dec. 19, 2019   (KR) .................. 10-2019-0170564

(51) Int. Cl.
B32B 43/00 (2006.01)
B32B 37/00 (2006.01)
B32B 38/18 (2006.01)
B32B 17/10 (2006.01)

(52) U.S. Cl.
CPC ........ B32B 43/006 (2013.01); B32B 37/0038 (2013.01); B32B 38/18 (2013.01); B32B 17/10 (2013.01); B32B 2457/20 (2013.01)

(58) Field of Classification Search
CPC ... B32B 43/006; B32B 37/0038; B32B 38/18; B32B 17/10; B32B 2457/20
See application file for complete search history.

(56) References Cited

U.S. PATENT DOCUMENTS

2008/0113486 A1*  5/2008  Eguchi .............. G02F 1/13306
                                                        438/735
2016/0361913 A1* 12/2016  Ohno .................. H01L 27/3262

FOREIGN PATENT DOCUMENTS

JP         3832994            7/2006
KR      19940013752           7/1994
TW        201539531 A  * 10/2015  ....... H01L 21/02052

OTHER PUBLICATIONS

Translation of TW-201539531-A, Nagaoka Y, Oct. 2015 (Year: 2015).*

* cited by examiner

Primary Examiner — George R Koch
(74) Attorney, Agent, or Firm — CANTOR COLBURN LLP

(57) ABSTRACT

A peeling apparatus includes a water tank, a stage disposed in the water tank, a peeling member disposed above the stage, and a discharge preventing block disposed in the water tank and disposed outside the stage, wherein a height of the discharge preventing block is greater than a height of the stage.

20 Claims, 28 Drawing Sheets

DM: DM1, DM2
FL: FL1, FL2, FL3
GL: GL1, GL2

200: 210, 220, 230
300: 310, 310S, 320, 330, 340

PEELING APPARATUS AND METHOD OF MANUFACTURING DISPLAY DEVICE USING THE SAME

This application claims priority to Korean Patent Application No. 10-2019-0170564, filed on Dec. 19, 2019, and all the benefits accruing therefrom under 35 U.S.C. § 119, the content of which in its entirety is herein incorporated by reference.

BACKGROUND

1. Field

Exemplary embodiments of the invention relate to a peeling apparatus and a method of manufacturing a display device using the same.

2. Description of the Related Art

A display device is a device for displaying an image, and includes a display panel, such as an organic light emitting display panel or a liquid crystal display panel. The display device may include a protective member such as a window for protecting the display panel from an external impact. In particular, the window is widely applied to portable electronic devices, such as smart phones.

A base member that is used in the window includes a transparent film or glass. In particular, in a case of glass (or cells), a plurality of glass members may be transferred in a stacked state for ease of transport in a process of manufacturing a display device. Then, for a lamination process, it is desired to separate each of the plurality of glass members in a stacked state.

SUMMARY

Exemplary embodiments of the invention provide a peeling apparatus capable of automatically separating and discharging a plurality of stacked glass members and films disposed between the glass members.

Exemplary embodiments of the invention also provide a method of manufacturing a display device using a peeling apparatus capable of automatically separating and discharging a plurality of stacked glass members and films disposed between the glass members.

However, the invention is not restricted to those set forth herein. The above and other exemplary embodiments of the invention will become more apparent to one of ordinary skill in the art to which the invention pertains by referencing the detailed description of the invention given below.

An exemplary embodiment of a peeling apparatus includes a water tank, a stage disposed in the water tank, a peeling member disposed above the stage, and a discharge preventing block disposed in the water tank and disposed outside the stage, wherein a height of the discharge preventing block is greater than a height of the stage.

An exemplary embodiment of a method of manufacturing a display device includes disposing a target stack including a plurality of stacked glass members on a stage, elevating the stage on which the target stack is disposed, and peeling off a first glass member of the plurality of stacked glass members disposed at an uppermost portion of the target stack using a peeling member, wherein the peeling of the first glass member is performed in a water tank filled with water.

The peeling apparatus in an exemplary embodiment may automatically separate and discharge a plurality of stacked glass members and films disposed between the glass members.

The method of manufacturing a display device in an exemplary embodiment may automatically separate and discharge a plurality of stacked glass members and films disposed between the glass members, thereby increasing production efficiency.

The effects of the invention are not limited to the aforementioned effects, and various other effects are included in the specification.

BRIEF DESCRIPTION OF THE DRAWINGS

The above and other advantages and features of the invention will become more apparent by describing in detail exemplary embodiments thereof with reference to the attached drawings, in which:

FIGS. 10A to 11B are enlarged views of the periphery of the peeling member showing how the first dummy of the target stack is peeled off while FIG. 11B is an enlarged view of a portion of FIG. 11A;

DETAILED DESCRIPTION

Figure 1:
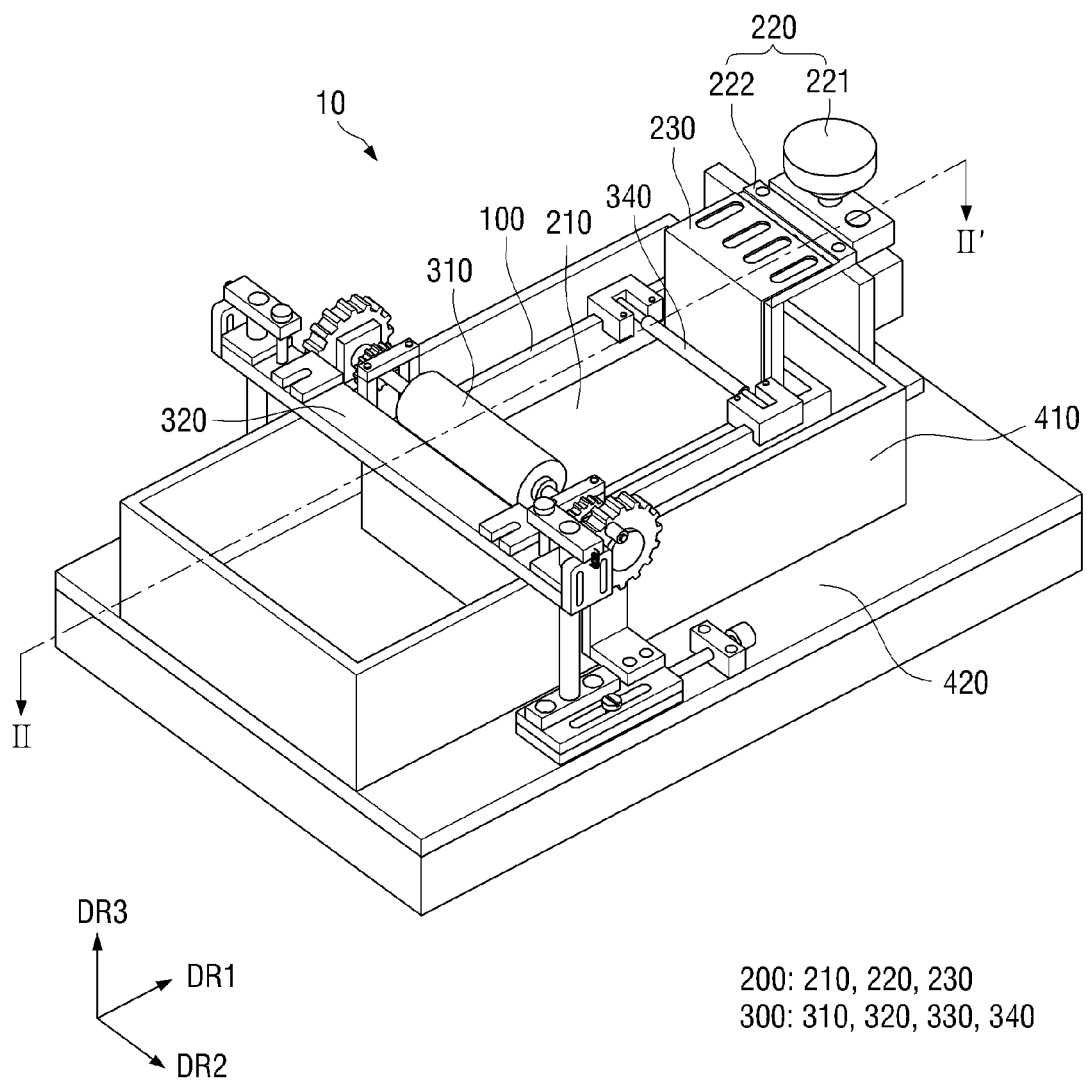
FIG. 1 is a perspective view of an exemplary embodiment of a peeling apparatus.

Exemplary embodiments of the invention will now be described more fully hereinafter with reference to the accompanying drawings, in which preferred embodiments of the invention are shown. This invention may, however, be embodied in different forms and should not be construed as limited to the exemplary embodiments set forth herein. Rather, these embodiments are provided so that this invention will be thorough and complete, and will filly convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification. In the attached drawing figures, the thickness of layers and regions is exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

In concluding the detailed description, those skilled in the art will appreciate that many variations and modifications may be made to the preferred embodiments without substantially departing from the principles of the invention. Therefore, the disclosed preferred embodiments of the invention are used in a generic and descriptive sense only and not for purposes of limitation.

Hereinafter, exemplary embodiments will be described in detail with reference to the accompanying drawings.

Figure 2:
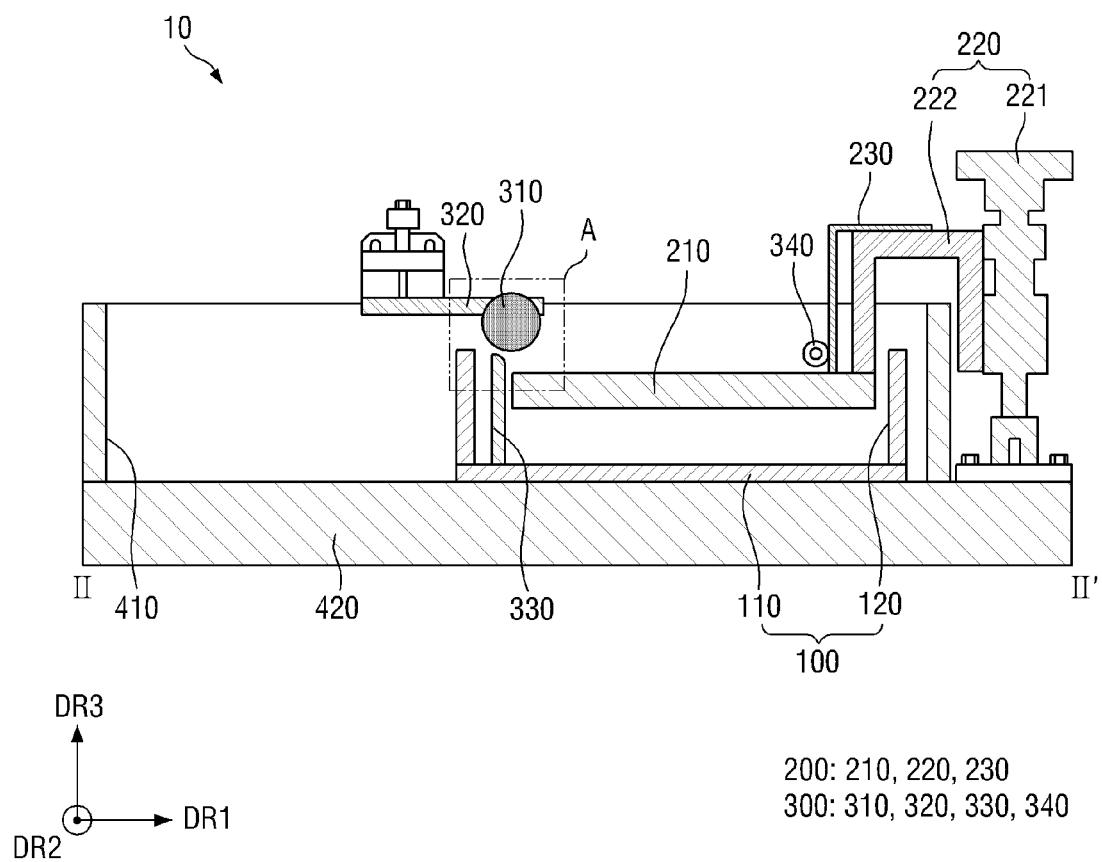
FIG. 2 is a cross-sectional view taken along line II-IP of FIG. 1.
Figure 3:
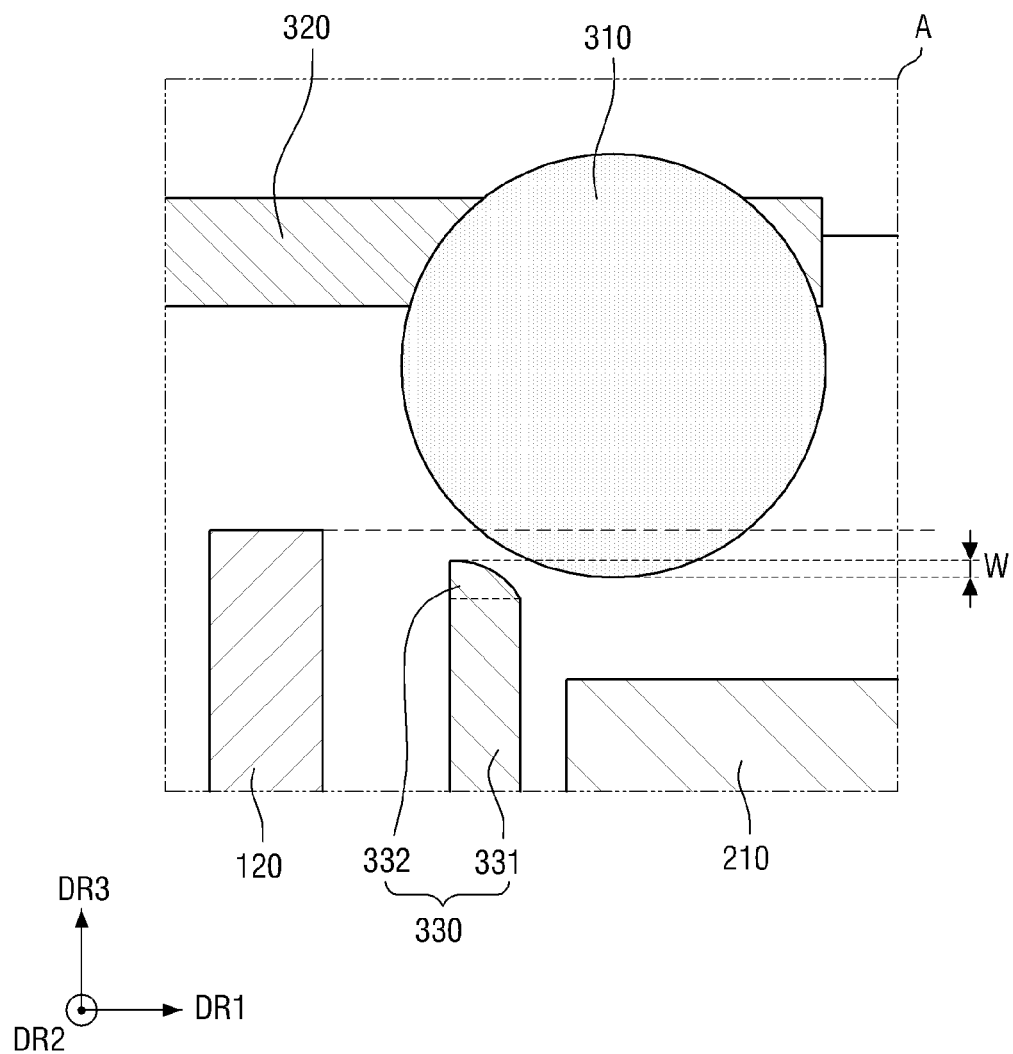
FIG. 3 is an enlarged view of region A of FIG. 2.

FIG. 1 is a perspective view of an exemplary embodiment of a peeling apparatus. FIG. 2 is a cross-sectional view taken along line II-IP of FIG. 1. FIG. 3 is an enlarged view of region A of FIG. 2.

Referring to FIGS. 1 and 3, a peeling apparatus 10 in an exemplary embodiment may include a water tank 100 in which a peeling process is performed, a stage module 200 which adjusts the position of a target stack 20 (refer to FIG. 5), a peeling module 300 which performs a peeling process of the target stack 20 (refer to FIG. 5), an outer wall 410 and support 420.

A space in which a peeling process is performed may be defined in the water tank 100. The water tank 100 serves to receive a stage 210, a discharge preventing block 330, and the like. To this end, an accommodation space for accommodating the aforementioned members may be defined in the water tank 100. The water tank 100 may include a bottom surface 110 and a sidewall portion 120 which is bent and extended in an upward direction at each edge along a circumference of the bottom surface 110.

The sidewall portion 120 of the water tank 100 may have a height greater than that of the stage 210 and the discharge preventing block 330. In other words, the height of the upper end of the sidewall portion 120 may be greater than the height of the upper end of the discharge preventing block 330, and may be greater than the height of the top surface of the stage 210, i.e., one surface on which the target stack 20 (refer to FIG. 5) may be disposed (e.g., mounted). That is, the entire area of the stage 210 and the entire area of the discharge preventing block 330 are disposed in the water tank 100.

In addition, although not shown in the drawings, the water tank 100 may be filled with a liquid filler WT during the peeling process. In an exemplary embodiment, the filler WT may be water ($H_2O$), ethanol ($C_2H_5OH$), or a surfactant, for example, but is not limited thereto.

Figure 5:
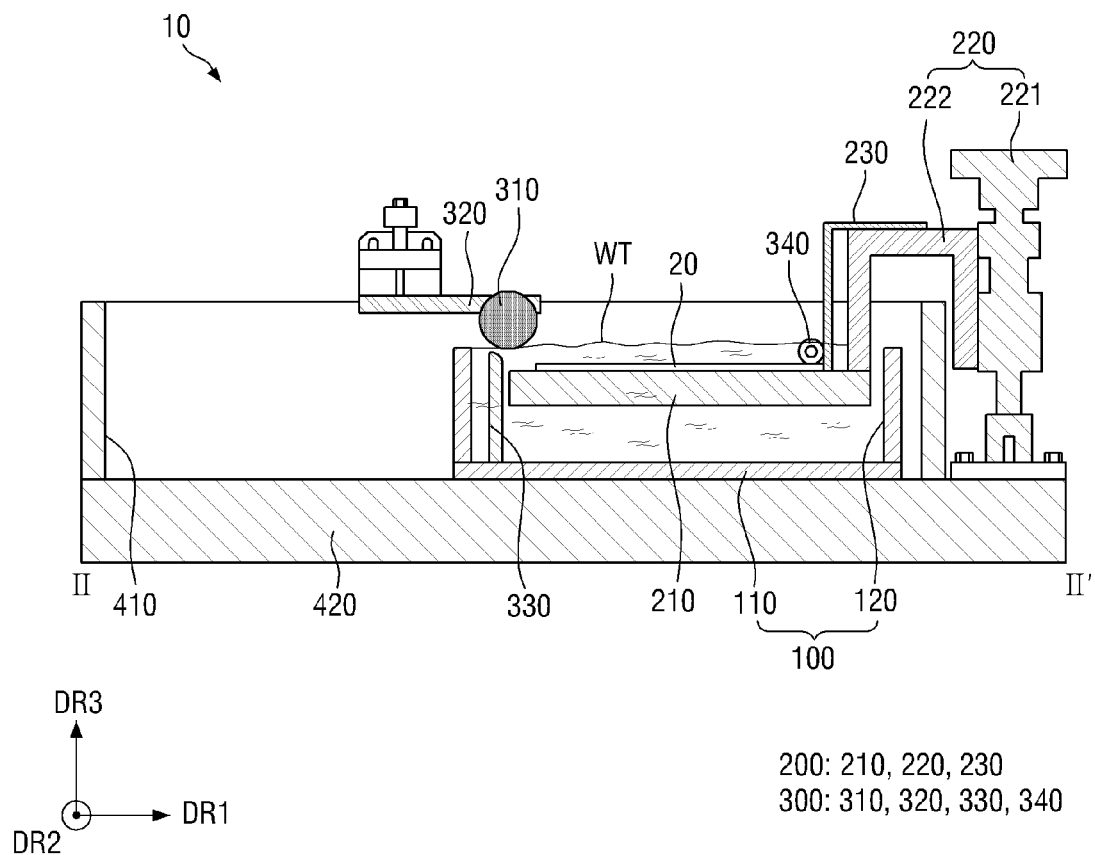
FIG. 5 is a cross-sectional view showing a state in which a target stack is disposed (e.g., mounted) on a stage of a peeling apparatus.

The stage module 200 may include the stage 210 on which the target stack 20 (refer to FIG. 5) is disposed (e.g., mounted), a height adjusting unit 220 which adjusts the height of the stage 210, and the target stack 20 (refer to FIG. 5), and a centering unit 230 which aligns the target stack 20 (refer to FIG. 5).

The stage 210 may be disposed in the water tank 100 and spaced apart from the bottom surface 110 of the water tank 100 by a predetermined interval. That is, the stage 210 may be disposed in the water tank 100 and disposed above the bottom surface 110 of the water tank 100. The target stack 20 (refer to FIG. 5) may be disposed (e.g., mounted) on the stage 210. The height of the stage 210 may be adjusted by the height adjusting unit 220.

Although it is illustrated in the drawing that the stage 210 is horizontal to the ground, the invention is not limited thereto. In an exemplary embodiment, the stage 210 may be inclined at an angle with respect to the ground, and the angle may range from 30 degrees to 60 degrees. In this case, the target stack 20 (refer to FIG. 5) disposed (e.g., mounted) on the stage 210 may also be inclined at the angle with respect to the ground, and the peeling apparatus 10 may further include a separate fixing member for fixing the target stack 20 (refer to FIG. 5) on the stage 210.

The height adjusting unit 220 may include a height adjustment driver 221 and a stage connector 222. By the height adjusting unit 220, it is possible to adjust the height of the stage 210 and the target stack 20 (refer to FIG. 5) disposed (e.g., mounted) on the stage 210. That is, by the height adjusting unit 220, the stage 210 and the target stack 20 (refer to FIG. 5) disposed (e.g., mounted) on the stage 210 may be moved up and down, and the target stack 20 (refer to FIG. 5) may contact a peeling member 310 of the peeling module 300.

The height adjustment driver 221 may vertically move the stage connector 222 connected to the height adjustment driver 221 and the stage 210 connected to the stage connector 222. The height adjustment driver 221 may be disposed outside the water tank 100, and may be, but not limited to, a linear motor or a cylinder.

The stage connector 222 may connect the stage 210 to the height adjustment driver 221. That is, the height of the stage 210 may be adjusted by the vertical movement of the height adjustment driver 221.

The centering unit 230 may be disposed on one side of the stage 210 to move the target stack 20 (refer to FIG. 5) toward the peeling member 310 of the peeling module 300 disposed on the other side of the stage 210 facing the one side. One end of the centering unit 230 may be disposed on the stage 210, and the other end of the centering unit 230 may be disposed at the stage connector 222, but the invention is not limited thereto.

The peeling module 300 may peel off each stacked member (dummy DM, glass GL and film FL (refer to FIG. 6)) on the target stack 20 (refer to FIG. 5). The peeling module 300 may include a peeling member 310, a peeling member supporter 320, a discharge preventing block 330, and a discharge preventing weight 340.

The peeling member 310 may be disposed above the stage 210. In an exemplary embodiment, the peeling member 310 may be a roller. Although not shown in the drawings, when the target stack 20 (refer to FIG. 5) is disposed (e.g., mounted) on the stage 210, the target stack 20 (refer to FIG. 5) may be disposed between the stage 210 and the peeling member 310. The surface of the peeling member 310 may be covered with rubber. The rubber covering the surface of the peeling member 310 may increase a frictional force between the peeling member 310 and the target stack 20 (refer to FIG. 5). As the peeling member 310 rotates, the stacked member disposed at the uppermost portion of the target stack 20 (refer to FIG. 5) may be peeled off. A detailed description thereof will be given later.

The peeling member supporter 320 may support the peeling member 310. Specifically, while the peeling member supporter 320 is disposed above the water tank 100, and connected to the upper surface of the support 420 outside the water tank 100, the peeling member supporter 320 may be supported to be positioned above the water tank 100. In addition, the peeling member supporter 320 may be connected to the peeling member 310 to support the peeling member 310 such that the peeling member 310 is disposed above the stage 210.

Although not shown in the drawings, the peeling member supporter 320 may further include a pressure adjusting spring, a pressure adjusting weight, and a peeling member driving unit. The pressure adjusting spring and the pressure adjusting weight may adjust the height of the peeling member supporter 320, and thus, the height of the peeling member 310 connected to the peeling member supporter 320 may be adjusted. The driving unit of the peeling member 310 may drive the peeling member 310 to rotate the peeling member 310. The peeling member driving unit may be automatically driven, or may be manually driven by an operator, although not limited thereto.

When the stacked member disposed at the uppermost portion of the target stack 20 (refer to FIG. 5) including a plurality of stacked members is peeled off, the discharge preventing block 330 may serve to prevent the remaining stacked members other than the corresponding stacked member from being peeled off.

The discharge preventing block 330 may be disposed inside the water tank 100 and disposed outside the stage 210. That is, the discharge preventing block 330 may be disposed between the stage 210 and the sidewall portion 120 of the water tank 100. In addition, the discharge preventing block 330 may be disposed below the peeling member 310. That is, the discharge preventing block 330 may overlap the peeling member 310 in a thickness direction (third direction DR3), but the invention is not limited thereto.

The height of the uppermost end of the discharge preventing block 330 may be greater than the height of the lowermost end of the peeling member 310. That is, the discharge preventing block 330 is disposed below the peeling member 310 and spaced apart from the peeling member 310 by a predetermined distance, but the uppermost end of the discharge preventing block 330 may be disposed at a higher level by a first thickness W than the lowermost end of the peeling member 310 in the thickness direction (third direction DR3). Although not limited thereto, the first thickness W may range from 0.5 millimeter (mm) to 1.0 mm, for example.

In addition, the discharge preventing block 330 may have a height greater than that of the stage 210. That is, the height of the uppermost end of the discharge preventing block 330 may be greater than the height of the upper surface of the stage 210, that is, the surface on which the target stack 20 (refer to FIG. 5) may be disposed (e.g., mounted). The thickness of the discharge preventing block 330 in the third direction DR3 may be greater than the thickness of the stage 210 in the third direction DR3, but the invention is not limited thereto.

Further, although not limited thereto, the height of the uppermost end of the discharge preventing block 330 and the height of the lowermost end of the peeling member 310 may be lower than the height of the uppermost end of the sidewall portion 120 of the water tank 100. That is, all parts of the discharge preventing block 330 may be disposed in the water tank 100, and a lower portion of the peeling member 310 may be disposed in the water tank 100.

The discharge preventing block 330 may include a base portion 331 and a tip portion 332 connected to the base portion 331. The base portion 331 is not limited thereto, but is connected to the bottom surface 110 of the water tank 100 and may have a uniform thickness (width in a first direction DR1). The thickness of the base portion 331 of the discharge preventing block 330 may be smaller than the length of the base portion 331 extending in the third direction DR3.

The tip portion 332 is connected to the base portion 331 and may have a thickness (width in the first direction DR1) smaller than the thickness of the base portion 331 (width in the first direction DR1). The thickness of the tip portion 332 may decrease toward the upper end thereof. One surface of the tip portion 332 facing the stage 210 may be referred to as an inner surface of the tip portion 332, and the other surface, which is an opposite surface of the inner surface of the tip portion 332, may be referred to as an outer surface of the tip portion 332. The inner surface of the tip portion 332 may have a rounded shape, but is not limited thereto.

One surface of the base portion 331 facing the stage 210 may be referred to as an inner surface of the base portion 331, and the other surface, which is an opposite surface of the inner surface of the base portion 331, may be referred to as an outer surface of the base portion 331. In this case, the outer surface of the tip portion 332 and the outer surface of the base portion 331 may be aligned with each other.

The discharge preventing weight 340 may be disposed above the stage 210. Although not shown in the drawings, when the target stack 20 (refer to FIG. 5) is disposed (e.g., mounted) on the stage 210, the discharge preventing weight 340 may apply pressure, from top to bottom, to the remaining stacked members other than the stacked member (to be peeled off) disposed at the uppermost layer of the target stack 20 (refer to FIG. 5). Accordingly, it is possible to prevent movement with the stacked member to be peeled off, and to prevent peeling with the stacked member.

As will be described later, as the peeling module 300 includes not only the peeling member 310 but also the discharge preventing block 330 and the discharge preventing weight 340, only one stacked member disposed at the uppermost portion of the target stack 20 (refer to FIG. 5) including a plurality of stacked members may be automatically peeled off, thereby improving process efficiency.

The outer wall 410 may be disposed outside the water tank 100. The outer wall 410 may surround the water tank 100 at the outside of the water tank 100. The inside of the water tank 100 may be filled with the liquid filler WT, and a peeling process may be performed in a state in which the water tank 100 is filled with the liquid filler WT. In this case, the liquid filler WT may flow out of the water tank 100. The outer wall 410 may trap the liquid filler WT flowing out of the water tank 100 in the outer wall 410.

The support 420 may be disposed below the outer wall 410 and the water tank 100. The support 420 may serve to support components such as the outer wall 410 and the water tank 100, and a space in which other components of the peeling apparatus 10 may be disposed may be defined on the support 420.

Hereinafter, there will be described a method of peeling off each stacked member (a plurality of glass members GL, a plurality of films FL and a plurality of dummies DM (refer to FIG. 6)) from the target stack 20 (refer to FIG. 5) including a plurality of stacked members. The glass member peeled off from the target stack 20 (refer to FIG. 5) may be used as a protective member (or window) of the display device.

Figure 4:
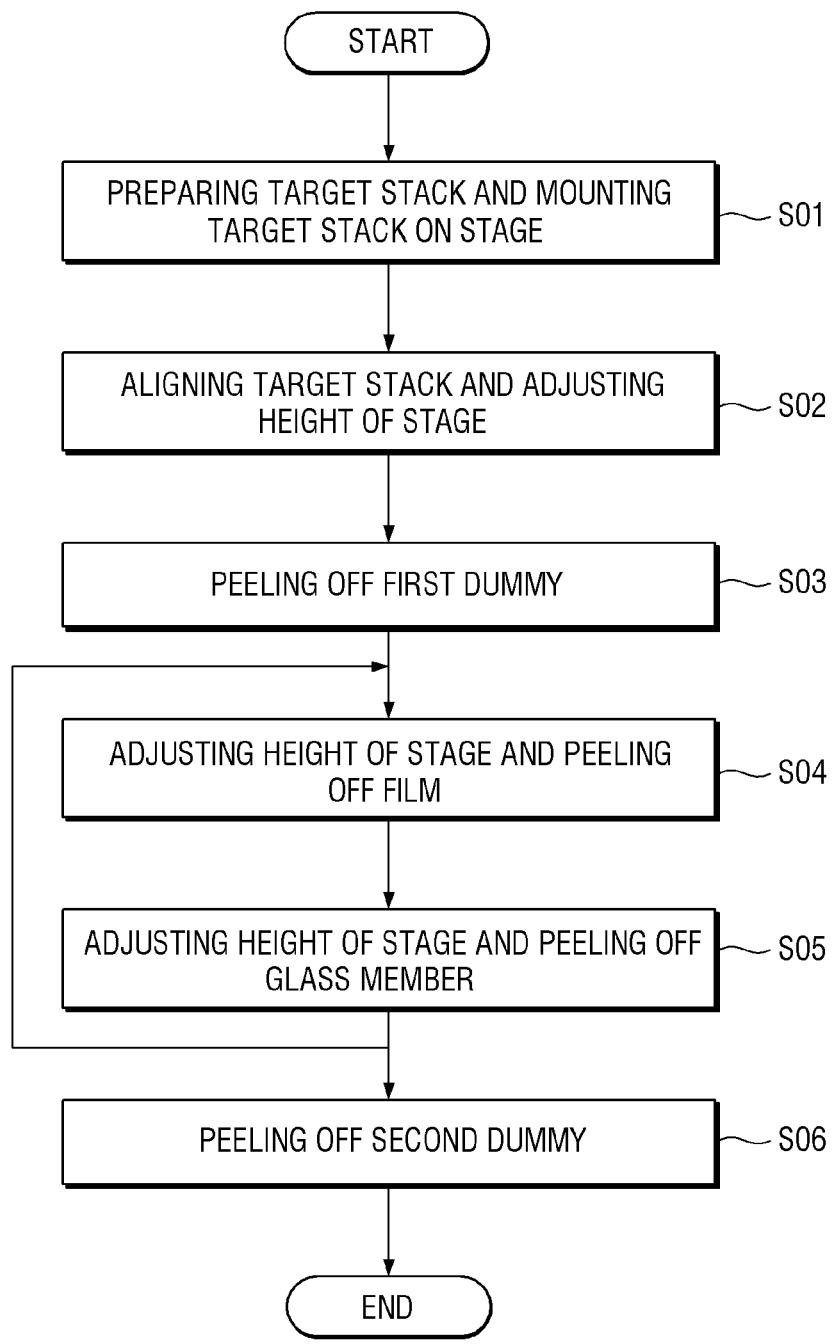
FIG. 4 is a flowchart showing a sequential process of peeling off each stacked member from a target stack.
Figure 6:
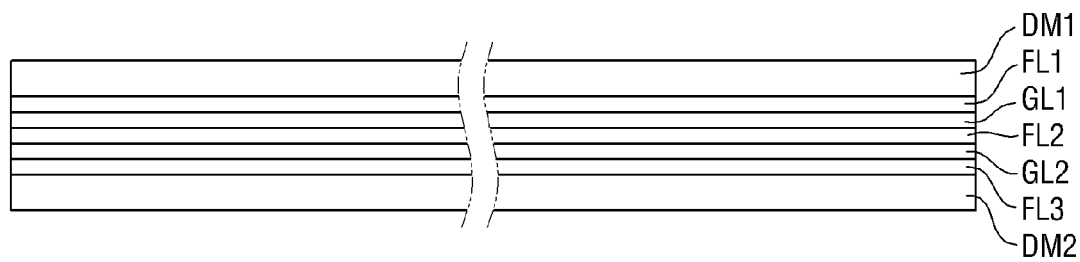
FIG. 6 is a side view of a target stack.
Figure 7:
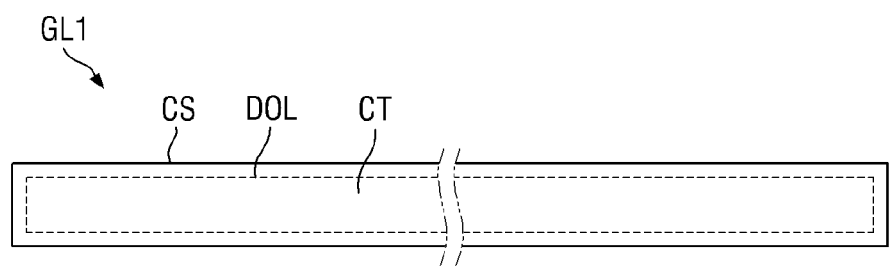
FIG. 7 is a cross-sectional view showing a glass member of a target stack.

FIG. 4 is a flowchart showing a sequential process of peeling off each stacked member from a target stack. FIG. 5 is a cross-sectional view showing a state in which a target stack is disposed (e.g., mounted) on a stage of a peeling apparatus. FIG. 6 is a side view of a target stack. FIG. 7 is a cross-sectional view showing a glass member of a target stack.

Referring to FIGS. 4 to 7, the target stack 20 including a plurality of stacked members is prepared, and the target stack 20 is disposed (e.g., mounted) on the stage 210 (operation S01).

Although not shown, the target stack 20 may be transferred onto the stage 210 by a robot arm or the like from the outside of the peeling apparatus 10. Further, the target stack 20 may be provided by cutting a portion of a plurality of mother glass substrates, which are stacked, into a desired shape. However, a method of forming the target stack 20 is not limited thereto.

A glass member GL may refer to a first glass member GL1 and a second glass member GL2. A film FL may refer to a first film FL1, a second film FL2, and a third film FL3. A dummy DM may refer to a first dummy DM1 and a second dummy DM2.

The target stack 20 may include the glass member GL, the film FL, and the dummy DM. That is, the target stack 20 may include the first glass member GL1, the second glass member GL2, the first film FL1, the second film FL2, the third film FL3, the first dummy DM1 and the second dummy DM2. Although it is illustrated in the drawing that two glass members GL and three films FL are disposed between the first dummy DM1 and the second dummy DM2, the number of glass members GL and the number of films FL are not limited thereto.

The target stack 20 may include the first dummy DM1, the first film FL1, the first glass member GL1, the second film FL2, the second glass member GL2, the third film FL3 and the second dummy DM2. The first dummy DM1, the first film FL1, the first glass member GL1, the second film FL2, the second glass member GL2, the third film FL3 and the second dummy DM2 may be stacked in this order. That is, the first dummy DM1 is disposed at the uppermost portion of the target stack 20, and the second dummy DM2 is disposed at the lowermost portion of the target stack 20. A plurality of glass members GL and a plurality of films FL may be disposed between the first dummy DM1 and the second dummy DM2. The respective films FL may be disposed between the glass members GL, between the first dummy DM1 and the first glass member GL1, and between the second dummy DM2 and the second glass member GL2.

The first glass member GL1 and the second glass member GL2 may have substantially the same configuration. Hereinafter, for simplicity of description, the first glass member GL1 and the second glass member GL2 will be referred to as the glass member GL, but the description of the glass member GL may be applied to the first glass member GL1 and the second glass member GL2.

The glass member GL may have a plate-like sheet shape having a predetermined thickness. As will be described later, the glass member GL may serve as a window of a display device 30 (refer to FIG. 17). The glass member GL may be applied as a window (or protective member) of the display device 30 (refer to FIG. 17), and may have a planar shape generally similar to the planar shape of the display device 30 (refer to FIG. 17). In an exemplary embodiment, when the display device 30 (refer to FIG. 17) has a rectangular shape, the planar shape of the glass member GL may also be rectangular, for example.

In an exemplary embodiment, the glass member GL may include ultra thin glass ("UTG") or thin glass, for example. As the glass member GL includes an ultra thin film or a thin film, the glass member GL may have a flexible property. That is, the glass member GL may be bent, folded, or rolled. In an exemplary embodiment, the thickness of the glass member GL may be in a range of 10 micrometers ($\mu$m) to 300 $\mu$m, for example. In an exemplary embodiment, the glass member GL having a thickness ranging from 30 $\mu$m to 80 $\mu$m or a thickness of about 50 $\mu$m may be applied, for example.

In an exemplary embodiment, the glass member GL may include soda-lime glass, alkali aluminosilicate glass, borosilicate glass, or lithium alumina silicate glass, for example.

The glass member GL may include chemically strengthened or thermally strengthened glass to have strong rigidity. Chemical strengthening may be achieved through an ion exchange process in alkaline salts. The ion exchange process may be performed two or more times.

The strengthened glass member GL may have a stress profile in a depth direction from the surface. In an exemplary embodiment, the glass member GL may include a compression region CS of the surface and a tensile region CT therein, for example. In the strengthened glass member GL, the stress is generally the largest at the surface and decreases toward the inside thereof. At the boundary between the compression region CS and the tensile region CT, a compression depth DOL, which is a point where stress is balanced, is defined.

The glass member GL may be obtained by strengthening after cutting the glass in a mother substrate state into cell units. The glass strengthening process forms the compression region CS near the surface. In an exemplary embodiment, during the ion exchange process, alkali salts and ions of the glass may be exchanged at the surface, and the exchanged ions may diffuse into the glass to form the compression region CS having a predetermined depth DOL, for example. However, when the ion exchange process is performed in a state where the glass member GL is cut into cell units, ion exchange may be performed through a side surface as well as an upper surface and a lower surface of the glass member GL. Therefore, the compression region CS may be provided not only near the upper surface and the lower surface of the glass member GL but also near the side surface of the glass member GL.

As the compression region CS is provided near the surface of the glass member GL, the surface of the glass member GL may not be easily scratched. That is, the surface of the glass member GL may have excellent scratch resistance.

The first film FL1 to the third film FL3 may have substantially the same configuration. For simplicity of description, although the first film FL1 to the third film FL3 will be referred to as the film FL, the description of the film FL may also be applied to the first film FL1 to the third film FL3.

The film FL may be cured resin. In a process of stacking the plurality of mother substrates described above, the resin may be applied between the mother substrates to bond the mother substrates to each other. Accordingly, when the target stack 20 is transferred, the target stack 20 may be more stably transferred.

The first dummy DM1 and the second dummy DM2 may have substantially the same configuration as the glass member GL. However, the thickness of the first dummy DM1 and the second dummy DM2 may be greater than the thickness of the glass member GL. Since the first dummy DM1 is disposed at the uppermost portion of the target stack 20 and the second dummy DM2 is disposed at the lowermost portion of the target stack 20, the plurality of glass members GL disposed between the first dummy DM1 and the second dummy DM2 may be protected from an external impact that may occur in the process of transferring the target stack 20.

The inside of the water tank 100 may be filled with the liquid filler WT. In an exemplary embodiment, the filler WT may be water ($H_2O$), for example. In the following description, it is assumed that the filler WT is water ($H_2O$), but the invention is not limited thereto. In an exemplary embodiment, the filler WT may be ethanol ($C_2H_5OH$), a surfactant or the like, for example.

As the inside of the water tank 100 is filled with water ($H_2O$), the stage 210, the target stack 20 disposed (e.g., mounted) on the stage 210, the lower portion of the peeling member 310 and the discharge preventing block 330 may be immerged in water ($H_2O$) and most of the peeling process may be performed in a state where the stage 210, the target stack 20 disposed (e.g., mounted) on the stage 210, the lower portion of the peeling member 310 and the discharge preventing block 330 are immerged in water ($H_2O$).

The temperature of the water ($H_2O$) may a temperature above zero degree Celsius (° C.), ranging from 30° C. to 90° C., or from 70° C. to 90° C., but is not limited thereto. When the temperature of the water ($H_2O$) filling the inside of the water tank 100 is as described above, peeling of the target stack 20 may be more easily performed.

Specifically, when the target stack 20 is immersed in the water ($H_2O$) of the above-mentioned temperature, it may weaken a bonding force with the first glass member GL1, the second glass member GL2, the first dummy DM1 or the second dummy DM2 in contact with the film FL. That is, when the film FL is immersed in the water ($H_2O$) of the above-mentioned temperature, the bonding force of the film FL itself may be reduced by physical and/or chemical change. In addition, the water ($H_2O$) may penetrate between the film FL and the first glass member GL1, the second glass member GL2, the first dummy DM1, or the second dummy DM2. Thus, the film FL may be physically separated from the first glass member GL1, the second glass member GL2, the first dummy DM1, or the second dummy DM2. Accordingly, the frictional force between the film FL and the first glass member GL1, the second glass member GL2, the first dummy DM1, or the second dummy DM2 may be reduced, which makes it possible to more smoothly perform the peeling process to be performed later.

Further, although not shown in the drawings, before the target stack 20 is disposed (e.g., mounted) on the stage 210, an additional process may be performed such that the target stack 20 is immersed in the water (H₂O) of the above-mentioned temperature for 20 minutes to 30 minutes in a separate space.

Figure 8:
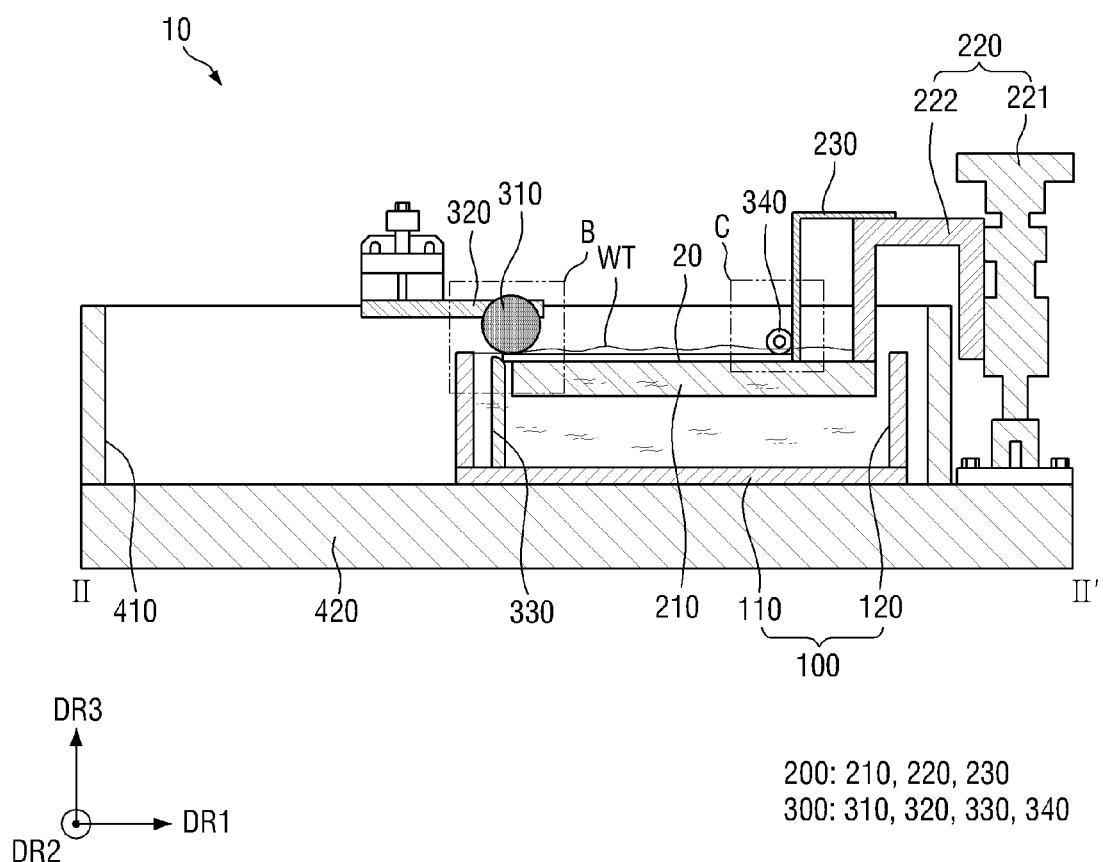
FIG. 8 is a cross-sectional view illustrating a state in which a target stack disposed (e.g., mounted) on a stage is aligned.
Figure 9:
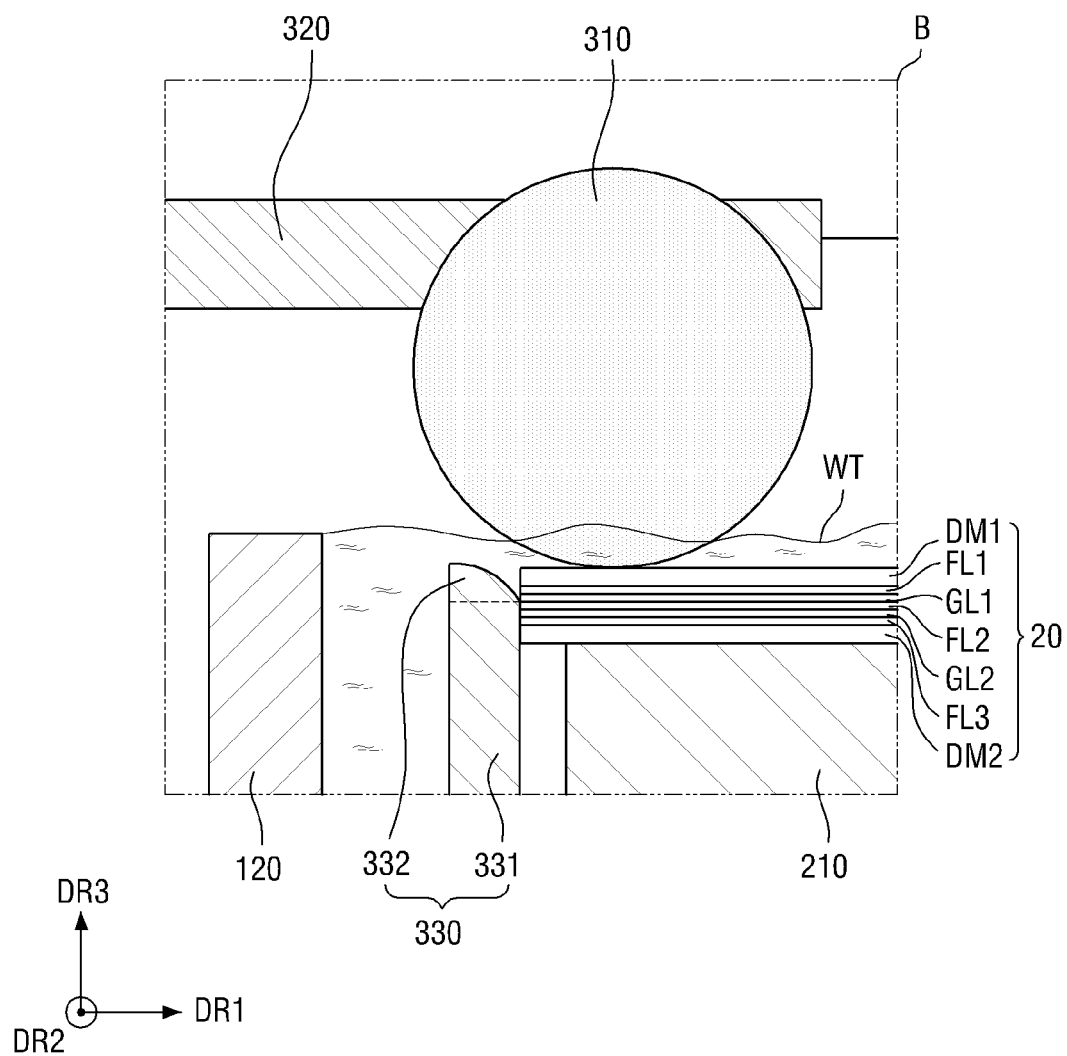
FIG. 9 is an enlarged view of region B of FIG. 8.

FIG. 8 is a cross-sectional view illustrating a state in which a target stack disposed (e.g., mounted) on a stage is aligned. FIG. 9 is an enlarged view of region B of FIG. 8.

Then, referring to FIGS. 8 and 9, the target stack 20 disposed (e.g., mounted) on the stage 210 is aligned (operation S02).

Specifically, by moving the centering unit 230 in the first direction DR1, the centering unit 230 may push the target stack 20 disposed (e.g., mounted) on the stage 210 in the first direction DR1 to move the target stack 20 toward the discharge preventing block 330. In this case, the target stack 20 may be moved in the first direction DR1 until at least a portion of the target stack 20 contacts with the inner surface of the discharge preventing block 330. However, the method of moving the target stack 20 in the first direction DR1 is not limited thereto.

Thereafter, the stage 210 is elevated in the thickness direction (third direction DR3), and accordingly, the target stack 20 disposed (e.g., mounted) on the stage 210 may be elevated in the thickness direction (third direction DR3). By elevating the target stack 20, the target stack 20 may contact the peeling member 310. The stage 210 and the target stack 20 disposed (e.g., mounted) on the stage 210 may be elevated by the height adjusting unit 220, but the method of elevating the stage 210 and the target stack 20 disposed (e.g., mounted) on the stage 210 is not limited thereto.

Figure 10A:
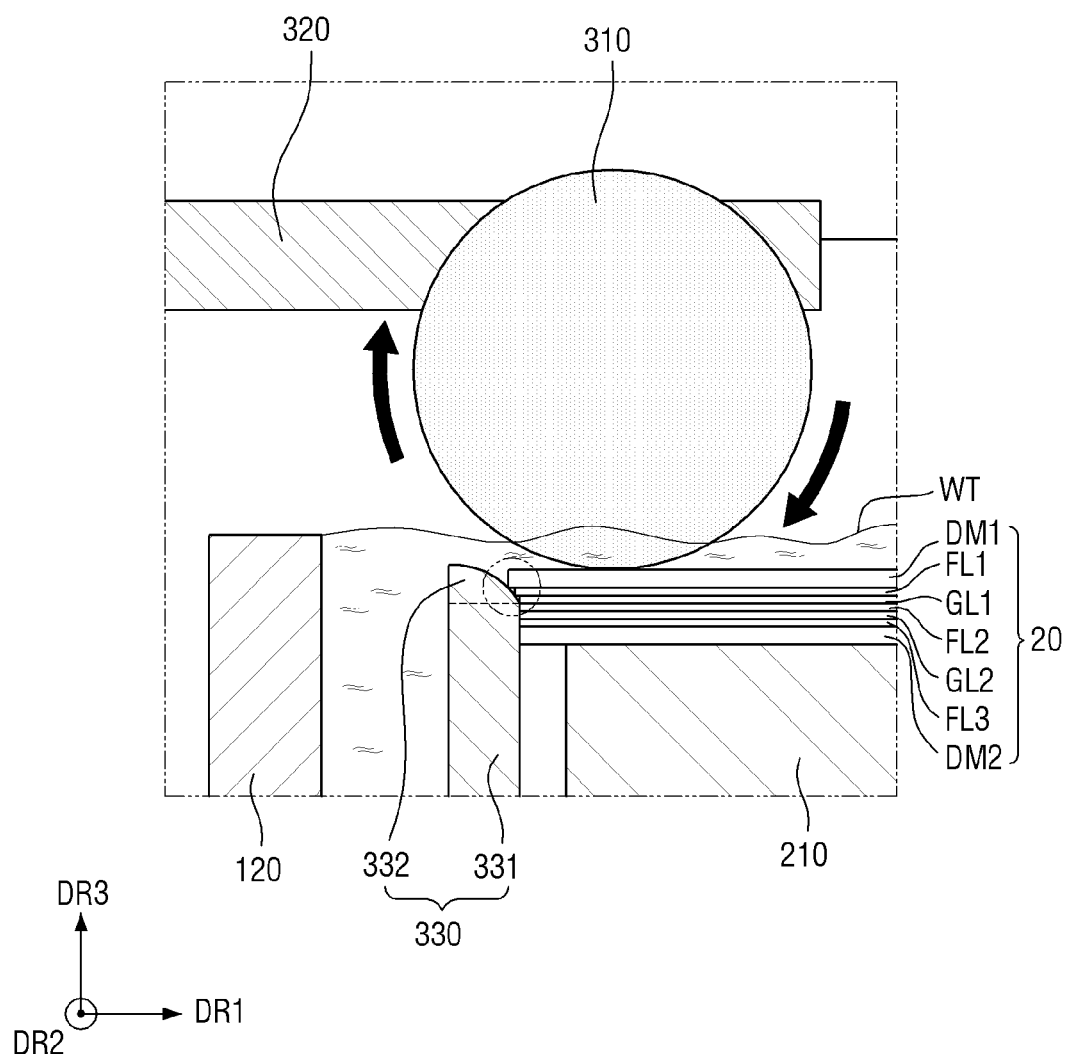
Figure 10B:
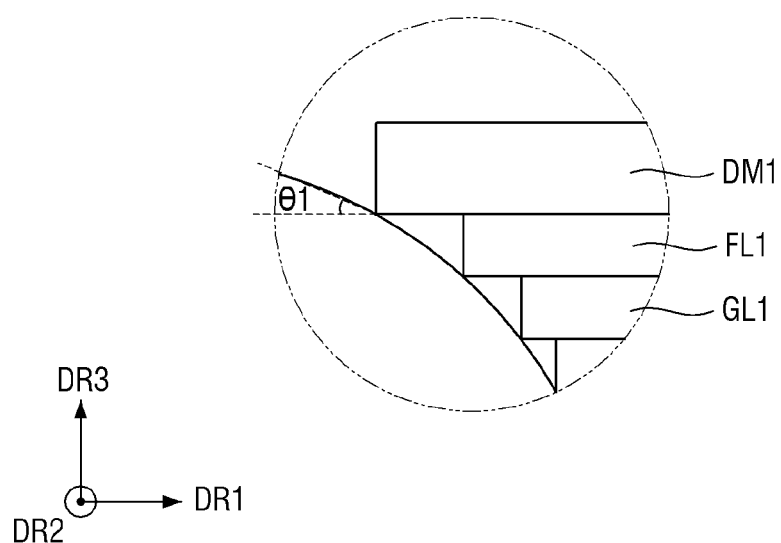
FIG. 10B is an enlarged view of a portion of FIG. 10A
Figure 11A:
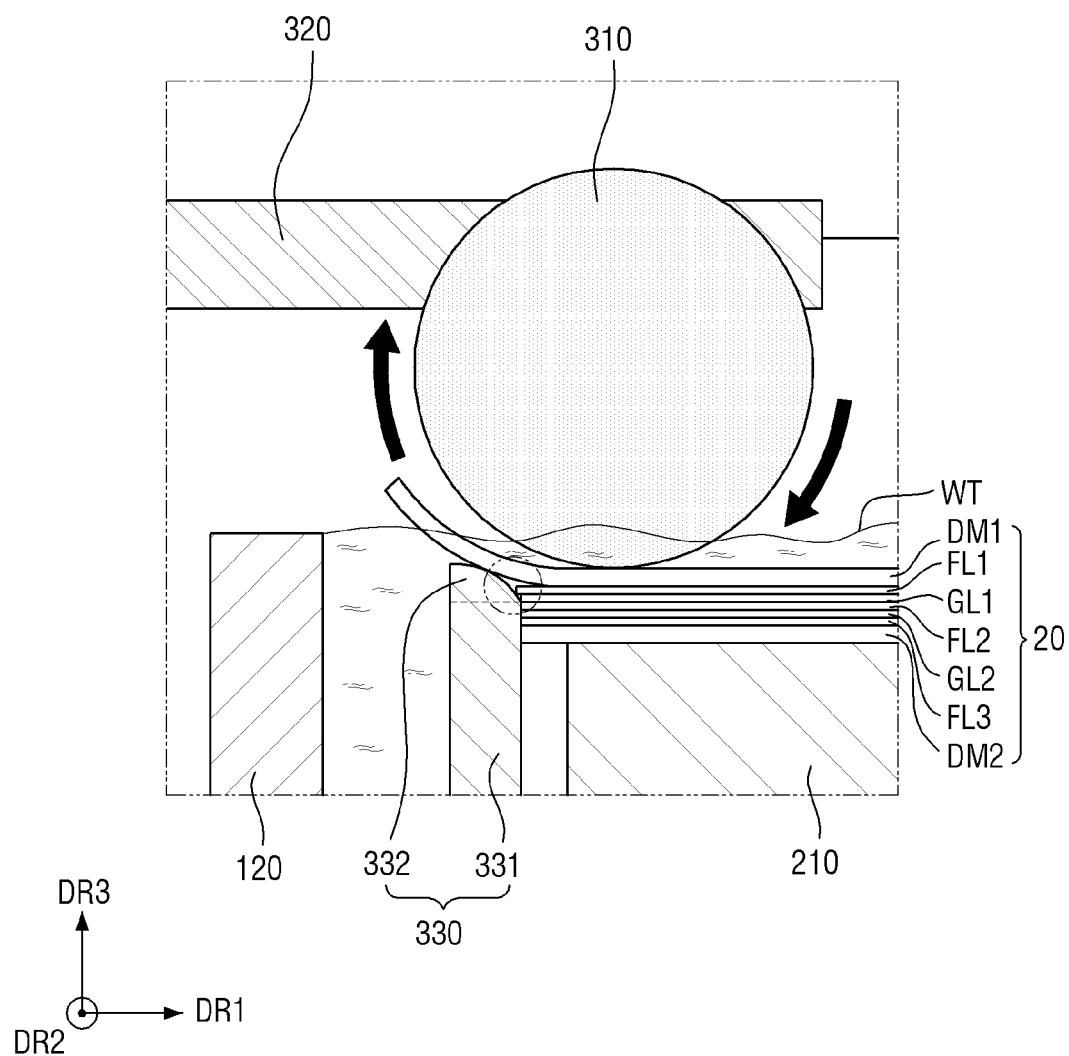
Figure 11B:
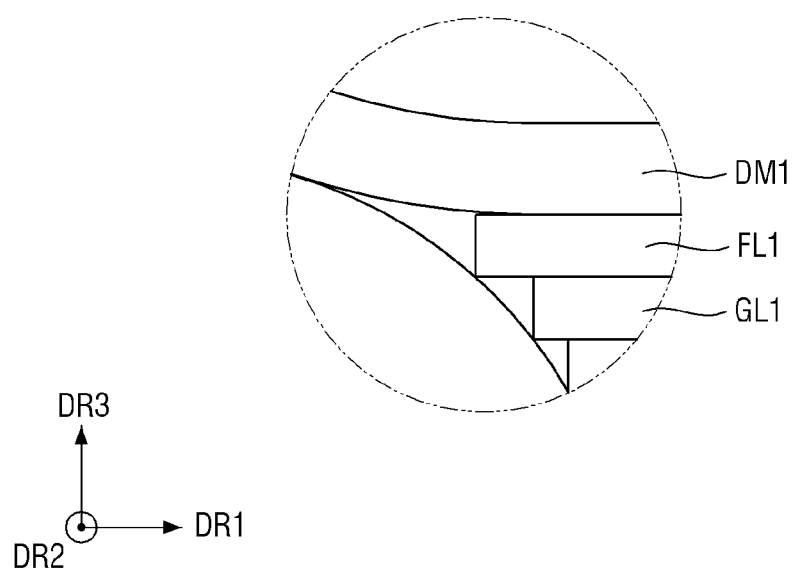
Figure 12:
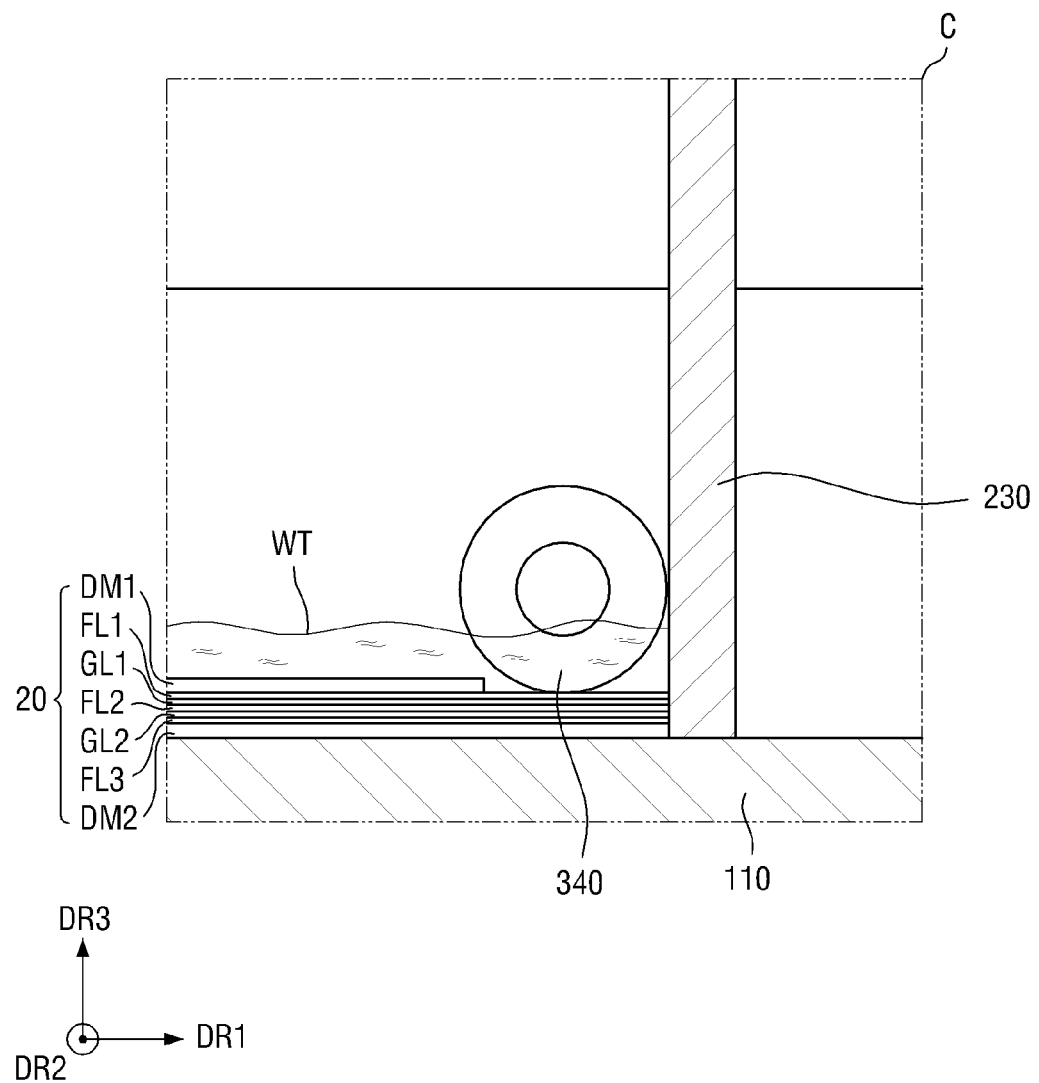
FIG. 12 is an enlarged view of an area C of FIG. 8 at the periphery of the discharge preventing weight when the first dummy of the target stack is peeled off.

FIGS. 10A to 11B are enlarged views of the periphery of the peeling member showing how the first dummy of the target stack is peeled off while FIG. 10B is an enlarged view of a portion of FIG. 10A and FIG. 11B is an enlarged view of a portion of FIG. 11A. FIG. 12 is an enlarged view of an area C of FIG. 8 at the periphery of the discharge preventing weight when the first dummy of the target stack is peeled off.

Referring to FIGS. 10A to 12, as the peeling member 310 rotates, the first dummy DM1 stacked on the uppermost portion of the target stack 20 is peeled off (operation S03).

By the elevation of the stage 210, the first dummy DM1 disposed at the uppermost portion of the target stack 20 contacts the peeling member 310. By the rotation of the peeling member 310, the first dummy DM1 and some of the remaining stacked members other than the first dummy DM1 may move in the first direction DR1. In this case, although the discharge preventing block 330 is disposed on the movement path of the first dummy DM1, the first dummy DM1 may be peeled off from the target stack 20, and may be discharged to the outside of the water tank 100 beyond the tip portion 332 of the discharge preventing block 330 and the upper portion of the water tank 100. The remaining stacked members disposed below the first dummy DM1 are blocked from moving in the first direction DR1 by the discharge preventing block 330, and the remaining stacked members are not peeled off.

Specifically, there may be an imaginary extension plane extending from the lower surface of the first dummy DM1, i.e., one surface of the first dummy DM1 facing the first film FL1, before the first dummy DM1 is peeled off from the target stack 20. The imaginary plane may be horizontal to the ground. At a point where the imaginary extension plane and the inner surface of the tip portion 332 of the discharge preventing block 330 meet each other, an acute angle θ1 between the imaginary extension plane and the inner surface of the tip portion 332 of the discharge preventing block 330 may range from 1 degree to 30 degrees, or range from 10 degrees to 20 degrees, but is not limited thereto.

With respect to the stage 210, a direction from the stage 210 toward the discharge preventing block 330 is referred to as one side of the first direction DR1, and a direction from the stage 210 toward the height adjusting unit 220 is referred to as the other side of the first direction DR1.

The peeling member 310 may rotate in a clockwise direction in cross-sectional view. By the frictional force between the peeling member 310 and the first dummy DM1, the first dummy DM1 may move toward the discharge preventing block 330 in the first direction DR1, i.e., to one side of the first direction DR1. In this case, when the acute angle θ1 between the imaginary plane extending from the lower surface of the first dummy DM1 and the inner surface of the tip portion 332 of the discharge preventing block 330 is as described above, the first dummy DM1 may continue to move toward the upper portion of the discharge preventing block 330 along the inner surface of the tip portion 332 of the discharge preventing block 330. When the peeling member 310 continues to rotate, the first dummy DM1 may continuously move toward one side of the first direction DR1, thereby being peeled off from the target stack 20.

The remaining stacked members of the target stack 20 disposed below the first dummy DM1 may move slightly to one side of the first direction DR1 until they contact the inner surface of the tip portion 332 of the discharge preventing block 330 by the shape of the tip portion 332 of the discharge preventing block 330. Although the remaining stacked members may move slightly to one side of the first direction DR1, when the stacked members meet the inner surface of the tip portion 332 of the discharge preventing block 330, the remaining stacked members may no longer move, and are blocked by the discharge preventing block 330 to prevent movement to one side of the first direction DR1. That is, the remaining stacked members other than the first dummy DM1 remain on the stage 210 without being peeled off from the target stack 20.

In addition, the discharge preventing weight 340 may serve to prevent the remaining stacked members other than the first dummy DM1 from being peeled off. The discharge preventing weight 340 may be disposed on the remaining stacked members other than the first dummy DM1 while being disposed on the other side of the target stack 20 in the first direction DR1. The discharge preventing weight 340 may have a predetermined weight, and may be disposed on the remaining stacked members other than the first dummy DM1, thereby applying a load to the remaining stacked members. In this case, the load is applied downward in the thickness direction. By the load, it is possible to suppress or prevent the remaining stacked members from moving to one side of the first direction DR1. That is, while the discharge preventing block 330 blocks the movement of the remaining stacked members, the discharge preventing weight 340 also suppresses the movement of the remaining stacked members. Accordingly, only the first dummy DM1 disposed at the uppermost portion of the target stack 20 may be peeled off.

Figure 13:
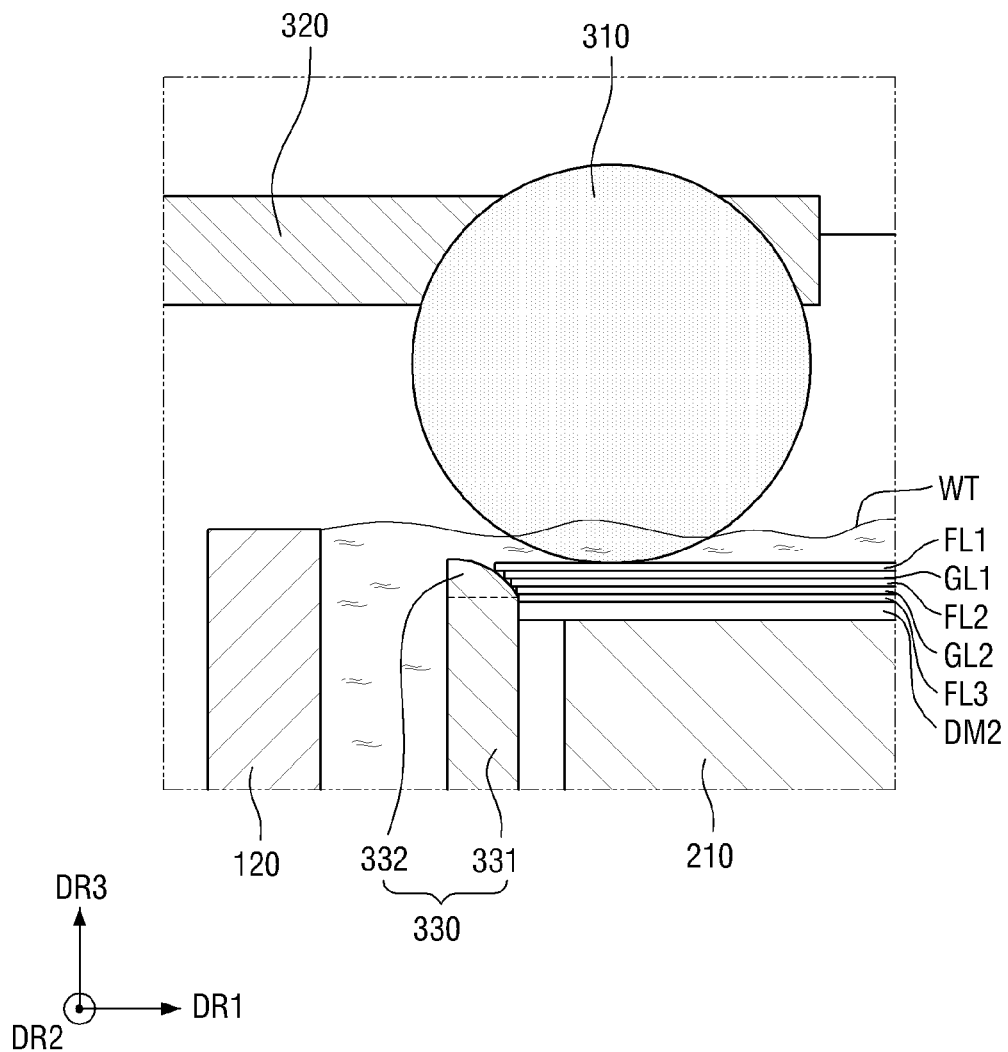
FIGS. 13 and 14 are enlarged views of the periphery of the peeling member showing how the first film is peeled off.
Figure 14:
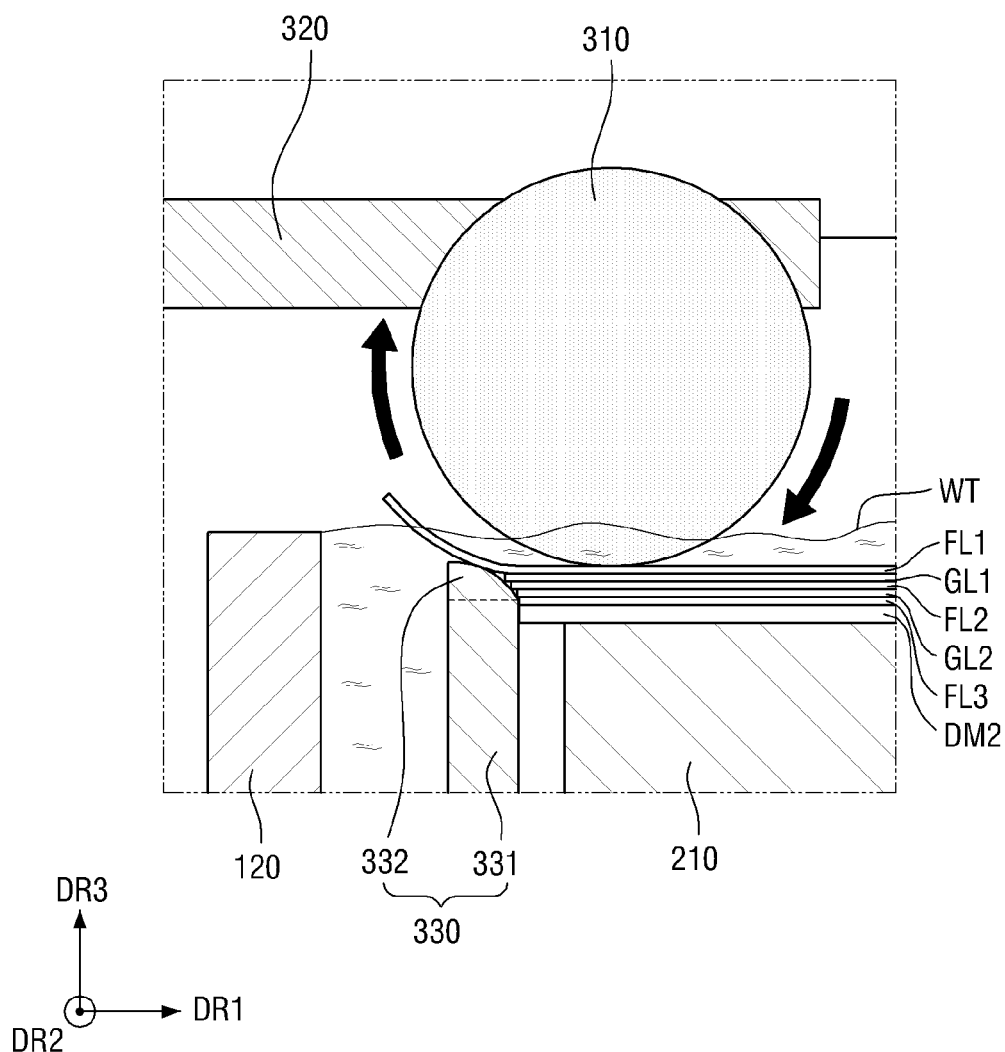

FIGS. 13 and 14 are enlarged views of the periphery of the peeling member showing how the first film is peeled off.

Referring to FIGS. 13 and 14, after the first dummy DM1 is peeled off, by elevating the stage 210 and the target stack 20 which is disposed (e.g., mounted) on the stage 210 and from which the first dummy DM1 has been peeled off, the first film FL1 disposed at the uppermost portion of the target stack 20, from which the first dummy DM1 has been peeled off, is peeled off (operation S04).

By elevating the stage 210 to elevate the target stack 20 from which the first dummy DM1 has been peeled off, the target stack 20 is moved such that the first film FL1 disposed at the uppermost portion of the target stack 20 contacts the peeling member 310.

After moving the first film FL1 to contact the peeling member 310, the peeling member 310 is driven to rotate the peeling member 310. By the rotation of the peeling member 310, the first film FL1 and some of the remaining stacked members other than the first film FL1 may move to one side of the first direction DR1. In this case, although the discharge preventing block 330 is disposed on the movement path of the first film FL1, the first film FL1 may be peeled off from the target stack 20, and may be discharged to the outside of the water tank 100 beyond the tip portion 332 of the discharge preventing block 330 and the upper portion of the water tank 100. The remaining stacked members disposed below the first film FL1 are blocked from moving in the first direction DR1 by the discharge preventing block 330 and the discharge preventing weight 340, and the remaining stacked members are not peeled off.

The peeling operation S04 in which only the first film FL1 is peeled off from the target stack 20 from which the first dummy DM1 has been peeled off, and the remaining stacked members other than the first dummy DM1 and the first film FL1 are not peeled off may be substantially the same as the peeling operation S03 of the first dummy DM1 described with reference to FIGS. 10A to 12. However, in the case of FIGS. 13 and 14, there is a difference only in that the first film FL1 rather than the first dummy DM1 is peeled off and the remaining stacked members other than the first dummy DM1 and the first film FL1 are disposed on the stage 210 without being peeled off. Thus, a redundant description will be omitted.

Figure 15:
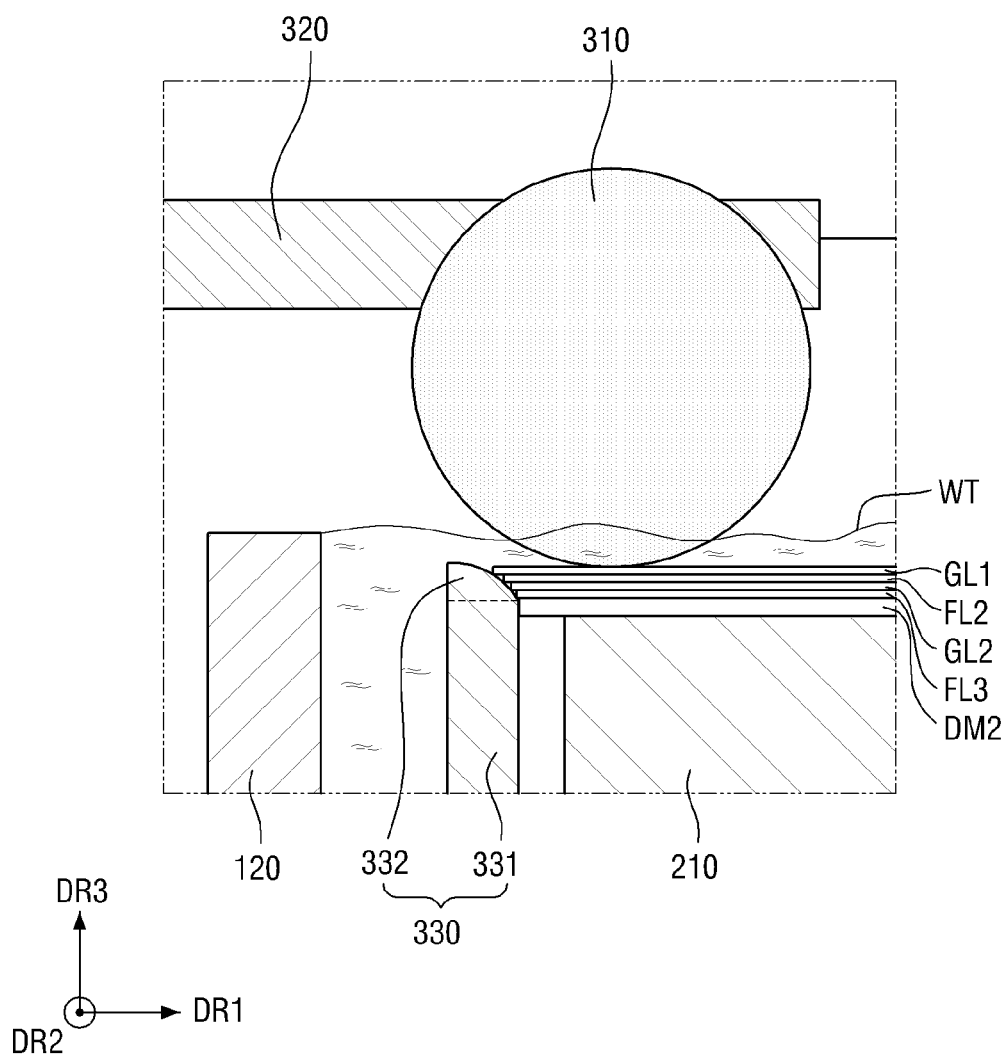
FIGS. 15 and 16 are enlarged views of the periphery of the peeling member showing how the first glass member is peeled off.
Figure 16:
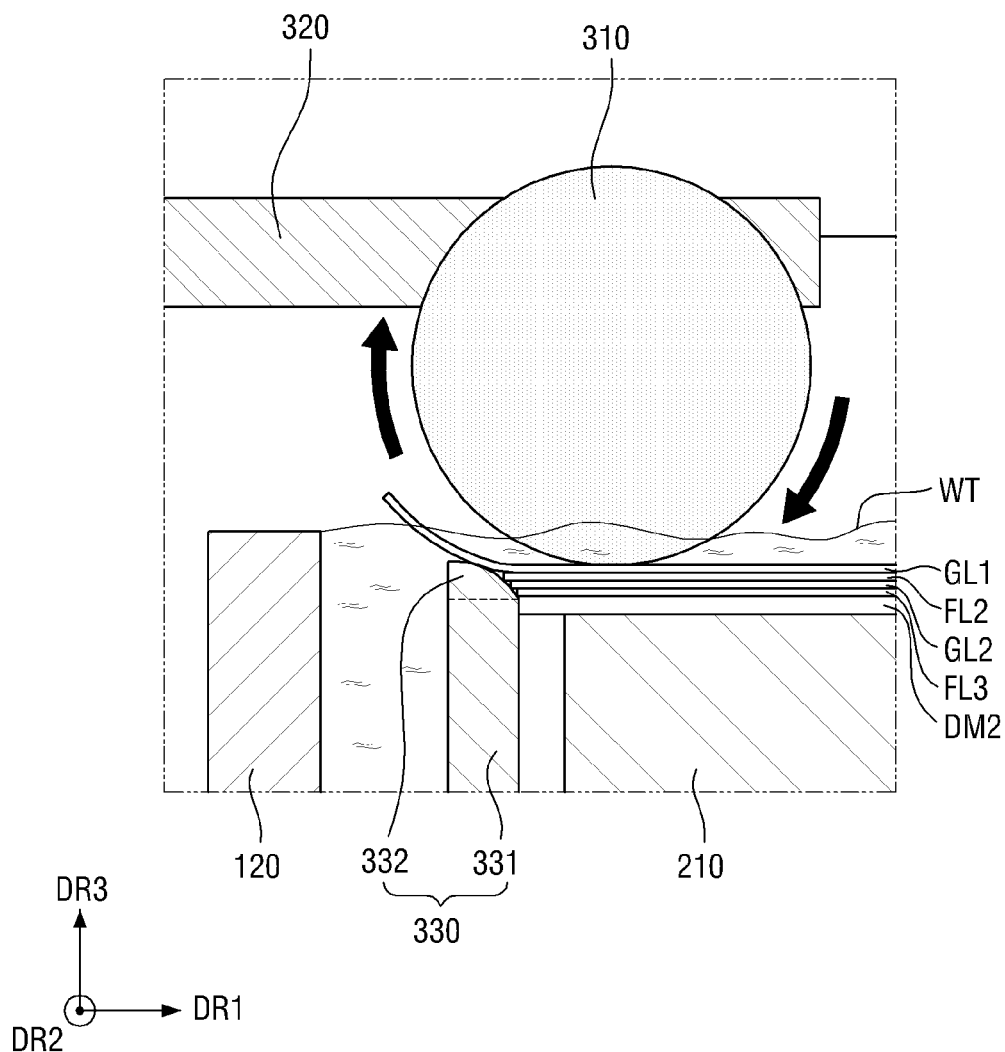

FIGS. 15 and 16 are enlarged views of the periphery of the peeling member showing how the first glass member is peeled off from the target stack from which the first dummy and the first film have been peeled off.

Referring to FIGS. 15 and 16, after the first dummy DM1 and the first film FL1 are peeled off, by elevating the stage 210 and the target stack 20 which is disposed (e.g., mounted) on the stage 210 and from which the first dummy DM1 and the first film FL1 have been peeled off, the first glass member GL1 disposed at the uppermost portion of the target stack 20 is peeled off (operation S05).

By elevating the stage 210 to elevate the target stack 20 from which the first dummy DM1 and the first film FL1 have been peeled off, the target stack 20 is moved such that the first glass member GL1 disposed at the uppermost portion of the target stack 20 contacts the peeling member 310.

After moving the first glass member GL1 to contact the peeling member 310, the peeling member 310 is driven to rotate the peeling member 310. By the rotation of the peeling member 310, the first glass member GL1 and some of the remaining stacked members other than the first dummy DM1, the first film FL1 and the first glass member GL1 may move to one side of the first direction DR1. In this case, although the discharge preventing block 330 is disposed on the movement path of the first glass member GL1, the first glass member GL1 may be peeled off from the target stack 20, and may be discharged to the outside of the water tank 100 beyond the tip portion 332 of the discharge preventing block 330 and the upper portion of the water tank 100. The remaining stacked members disposed below the first glass member GL1 are blocked from moving in the first direction DR1 by the discharge preventing block 330 and the discharge preventing weight 340, and the remaining stacked members are not peeled off.

The peeling operation S05 in which only the first glass member GL1 is peeled off from the target stack 20 from which the first dummy DM1 and the first film FL1 have been peeled off, and the remaining stacked members other than the first dummy DM1, the first film FL1 and the first glass member GL1 are not peeled off may be substantially the same as the peeling operation S03 of the first dummy DM1 described with reference to FIGS. 10A to 12. However, in the case of FIGS. 15 and 16, there is a difference only in that the first glass member GL1 rather than the first dummy DM1 is peeled off and the remaining stacked members other than the first dummy DM1, the first film FL1 and the first glass member GL1 are disposed on the stage 210 without being peeled off. Thus, a redundant description will be omitted.

Subsequently, although not shown, by repeating the operation S04 of peeling the first film FL1 and the operation S05 of peeling the first glass member GL1, the second film FL2, the second glass member GL2 and the third film FL3 may be sequentially removed. Although only the first film FL1 to the third film FL3 and the first glass member GL1 to the second glass member GL2 are illustrated in the drawings, as described above, the number of films FL and the number of glass members GL are not limited thereto. Therefore, the number of repeated operations S04 of peeling the first film FL1 the number of repeated operations S05 of peeling the first glass member GL1 may also vary according to the number of films FL and the number of glass members GL.

Subsequently, after all the films FL and all the glass members GL are peeled off, when the second dummy DM2 disposed at the lowermost portion of the target stack 20 is removed (operation S06), the whole peeling process is ended. The method of removing the second dummy DM2 may be performed according to the operation S04 of peeling the first film FL1 or the operation S05 of peeling the first glass member GL1. However, without being limited thereto, the operator may directly remove the second dummy DM2.

As described above, when the stacked members of the target stack 20 are peeled off using the peeling apparatus 10 in an exemplary embodiment, each stacked member may be automatically peeled off from the target stack 20. In addition, the plurality of stacked members of the target stack 20 may be continuously peeled off without a separate process. Accordingly, since the operator does not perform the peeling process directly, it is possible to ensure the safety of the operator. Also, it is possible to repeatedly perform the operation of peeling each stacked member, thereby improving the efficiency of the peeling process.

Hereinafter, a display device including the glass member GL peeled off using the peeling apparatus 10 in an exemplary embodiment will be described with reference to FIGS. 17 and 18.

Figure 17:
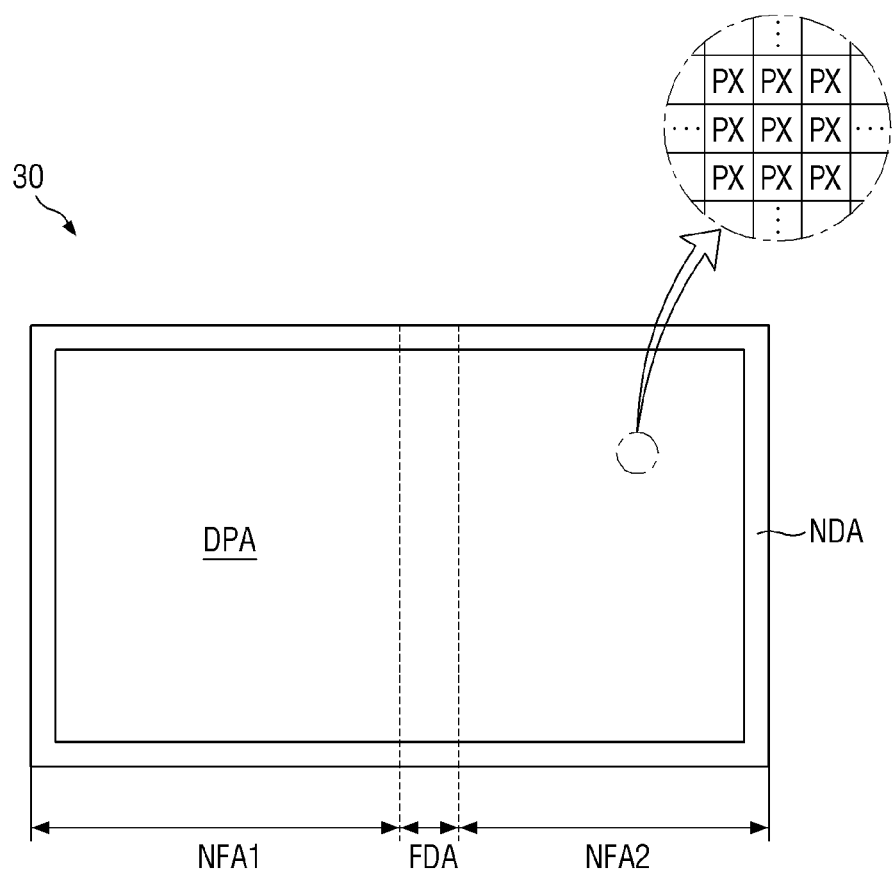
FIG. 17 is a plan view of an exemplary embodiment of a display device including a glass member peeled off using a peeling apparatus.

FIG. 17 is a plan view of an exemplary embodiment of a display device including a glass member peeled off using a peeling apparatus. FIG. 18 is a cross-sectional view when the display device of FIG. 17 is folded. In FIG. 18, a protective member PRT illustratively includes the first glass member GL1 of FIG. 7.

Figure 18:
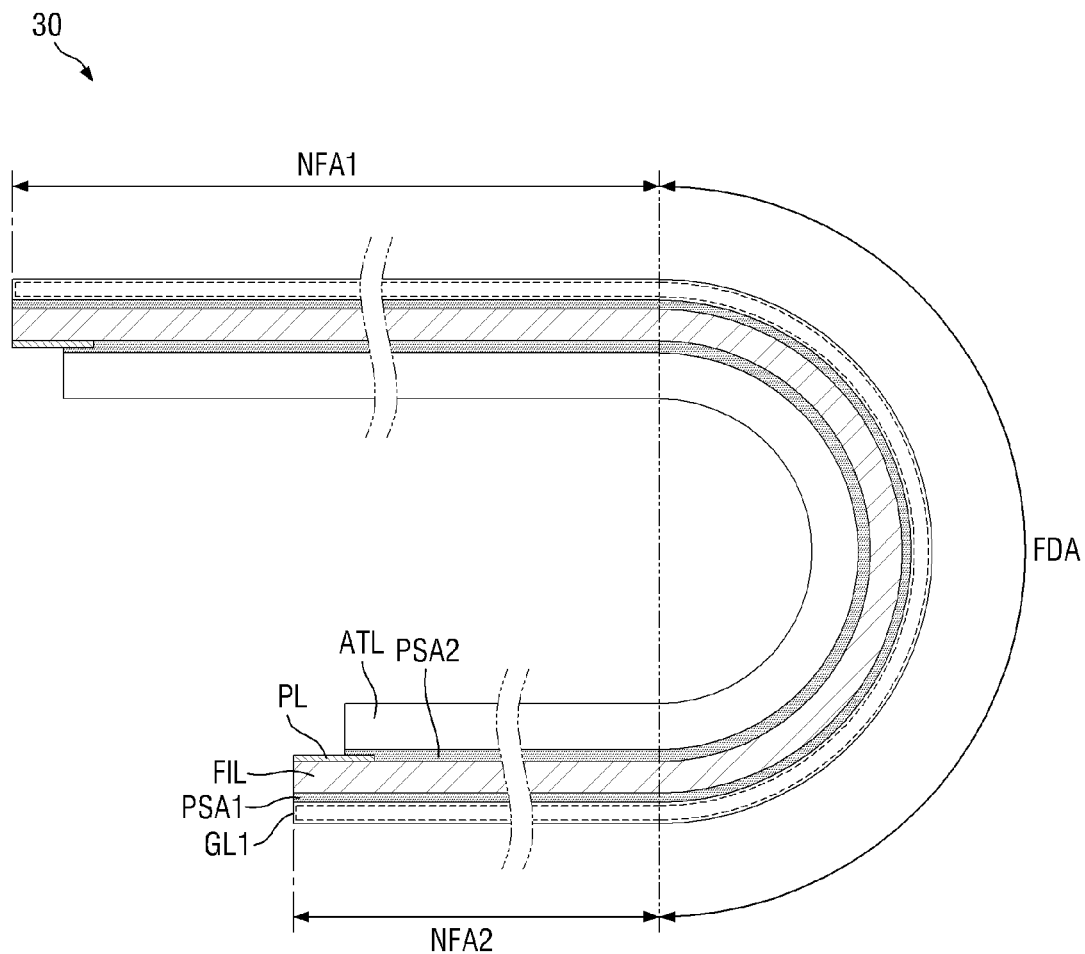
FIG. 18 is a cross-sectional view when the display device of FIG. 17 is folded.

Referring to FIGS. 17 and 18, a display device 30 displays a screen or an image through a display area DPA, and various devices including the display area DPA may be included therein. Examples of the display device 30 may include, but are not limited to, a smartphone, a mobile phone, a tablet personal computer ("PC"), a personal digital assistant ("PDA"), a portable multimedia player ("PMP"), a television, a game machine, a wristwatch-type electronic device, a head-mounted display, a monitor of a personal computer, a laptop computer, a car navigation system, a car's dashboard, a digital camera, a camcorder, an external billboard, an electronic billboard, various medical devices, various inspection devices, various household appliances such as a refrigerator and a washing machine including the display area DPA, an Internet-of-Things device ("IoT"), and the like.

The display device 30 includes the display area DPA and a non-display area NDA. The display area DPA is an area where a screen is displayed, and the non-display area NDA is an area where a screen is not displayed.

In the display area DPA, a plurality of pixels PX may be disposed. The pixel PX is a basic unit for displaying a screen. The pixels PX may include, but not limited to, a red pixel, a green pixel, and a blue pixel. The plurality of pixels PX may be alternately arranged in a plan view. In an exemplary embodiment, the pixels PX may be arranged in a matrix, for example, but the invention is not limited thereto.

The non-display area NDA may be disposed around the display area DPA. The non-display area NDA may be disposed around the display area DPA and may surround the display area DPA. In an exemplary embodiment, the display area DPA may be provided in a rectangular shape, and the non-display area NDA may be disposed around four sides of the display area DPA, but the invention is not limited thereto.

The display device 30 may include a folding area FDA, a first unfolded area NFA1, and a second unfolded area NFA2. The folding area FDA may be a region that is actually bent and folded to cross the center of the display device 30. The first unfolded area NFA1 and the second unfolded area NFA2 may be divided by the folding area FDA. A case where the widths of the first unfolded area NFA1 and the second unfolded area NFA2 are different from each other have been illustrated in the drawing, but the first unfolded area NFA1 and the second unfolded area NFA2 may have the same width.

Each of the folding area FDA, the first unfolded area NFA1 and the second unfolded area NFA2 may partially overlap the display area DPA and the non-display area NDA.

The folding may be performed by an in-folding method in which a display surface is folded inward and/or an out-folding method in which the display surface is folded outward. FIG. 18 shows an example in which folding is performed in an out-folding manner. As the display device 30 is folded, a display panel ATL and the protective member PRT are folded and bent together in the folding area FDA. The protective member PRT in the folding area FDA may be folded and unfolded repeatedly.

The display device 30 may include the display panel ATL and the protective member PRT disposed on the display panel ATL.

Examples of the display panel ATL may include not only a self-luminous display panel such as an organic light emitting diode ("OLED") display panel, an inorganic electroluminescence ("EL") display panel, a quantum dot ("QED") display panel, a micro-LED display panel, a nano-LED display panel, a plasma display panel ("PDP"), a field emission display ("FED") panel and a cathode ray tube ("CRT") display panel, but also a light receiving display panel such as a liquid crystal display ("LCD") panel and an electrophoretic display ("EPD") panel.

The protective member PRT may include a film layer FIL and a glass member GL1. The film layer FIL may perform a scattering prevention function. In an exemplary embodiment, even when the glass member GL1 is broken, since fragments are attached to the film layer FIL, scattering of the fragments may be prevented, for example. The film layer FIL may perform other functions such as impact resistance instead of or in addition to the scattering prevention function.

The glass member GL1 may be disposed on the film layer FIL. Since the glass member GL1 has been described in detail above, a redundant description thereof will be omitted.

A first bonding layer PSA1 may be disposed between the film layer FIL and the glass member GL1. The first bonding layer PSA1 may be interposed between the glass member GL1 and the film layer FIL to bond them. The first bonding layer PSA1 is preferably a tackifier layer, but may also be an adhesive layer.

A second bonding layer PSA2 may be disposed between the film layer FIL and the display panel ATL. The second bonding layer PSA2 may be a transparent layer such as an optically clear adhesive ("OCA") or an optically clear resin ("OCR"). The protective member PRT may be attached onto the display panel ATL by the second bonding layer PSA2.

The protective member PRT may further include a print layer PL disposed in the edge area. The print layer PL is disposed in the non-display area NDA. The print layer PL may be an edge coating layer. The print layer PL may be a decorative layer and/or an outermost black matrix layer that imparts an aesthetic appeal.

Hereinafter, other exemplary embodiments of the peeling apparatus 10 will be described. In the following embodiments, a description of the same components as those of the above-described embodiment will be omitted or simplified, and differences will be mainly described.

Figure 19A:
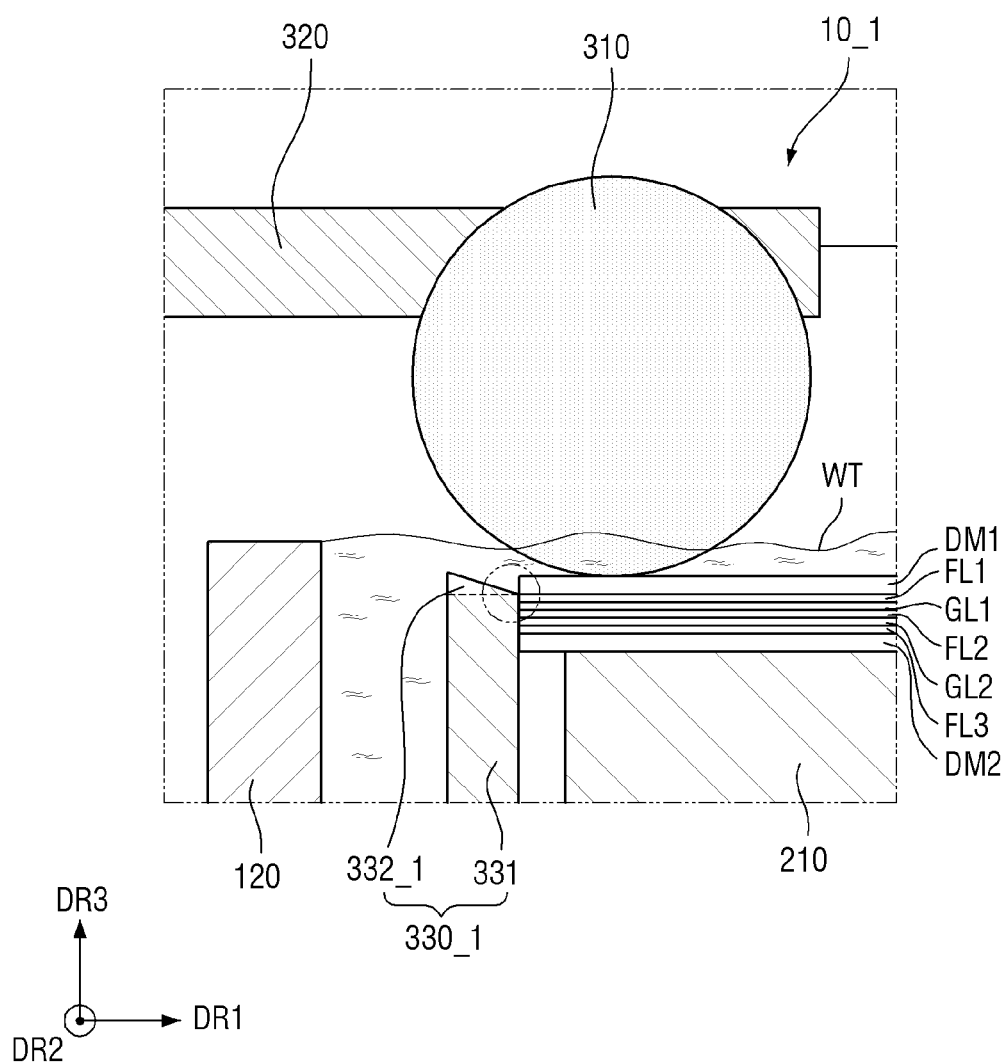
FIG. 19A is a cross-sectional view showing another exemplary embodiment of the periphery of a peeling member of a peeling apparatus.
Figure 19B:
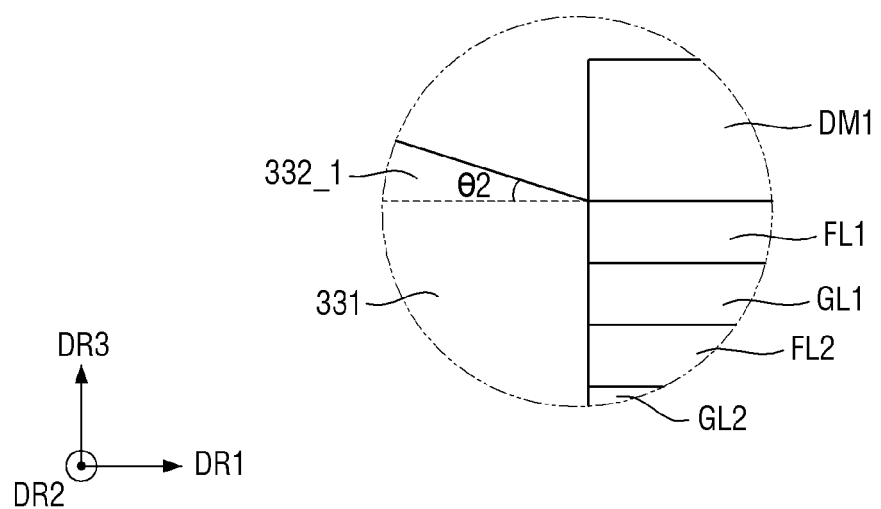
FIG. 19B is an enlarged view of a portion of FIG. 19A.

FIG. 19A is a cross-sectional view showing another exemplary embodiment of the periphery of a peeling member of a peeling apparatus and FIG. 19B is an enlarged view of a portion of FIG. 19A.

Referring to FIGS. 19A and 19B, a tip portion 332_1 of a discharge preventing block 330_1 included in a peeling apparatus 10_1 according to the illustrated exemplary embodiment is different from the exemplary embodiment of FIG. 2 in that the inner surface is not rounded.

Specifically, the peeling apparatus 10_1 according to the illustrated exemplary embodiment may include a discharge preventing block 330_1, and the discharge preventing block 330_1 may include a base portion 331 and a tip portion 332_1. However, the inner surface of the tip portion 332_1 of the discharge preventing block 330_1 is not rounded, and the inner surface of the tip portion 332_1 is connected in a straight line from an upper portion of the tip portion 332_1 toward a lower portion of the tip portion 332_1. That is, the inner surface of the tip portion 332_1 of the discharge preventing block 330_1 may be inclined with respect to the first direction DR1 and the third direction DR3. In addition, at a point where the inner surface of the tip portion 332_1 and the imaginary plane extending from the lower surface of the first dummy DM1 meet each other, an acute angle $\theta 2$ between the inner surface and the imaginary plane may range from 1 degree to 30 degrees, or range from 10 degrees to 20 degrees.

Also in this case, as the peeling member 310 rotates, the stacked members of the target stack 20 may be automatically peeled off one by one, thereby ensuring the safety of the operator and improving the efficiency of the peeling process.

Figure 20A:
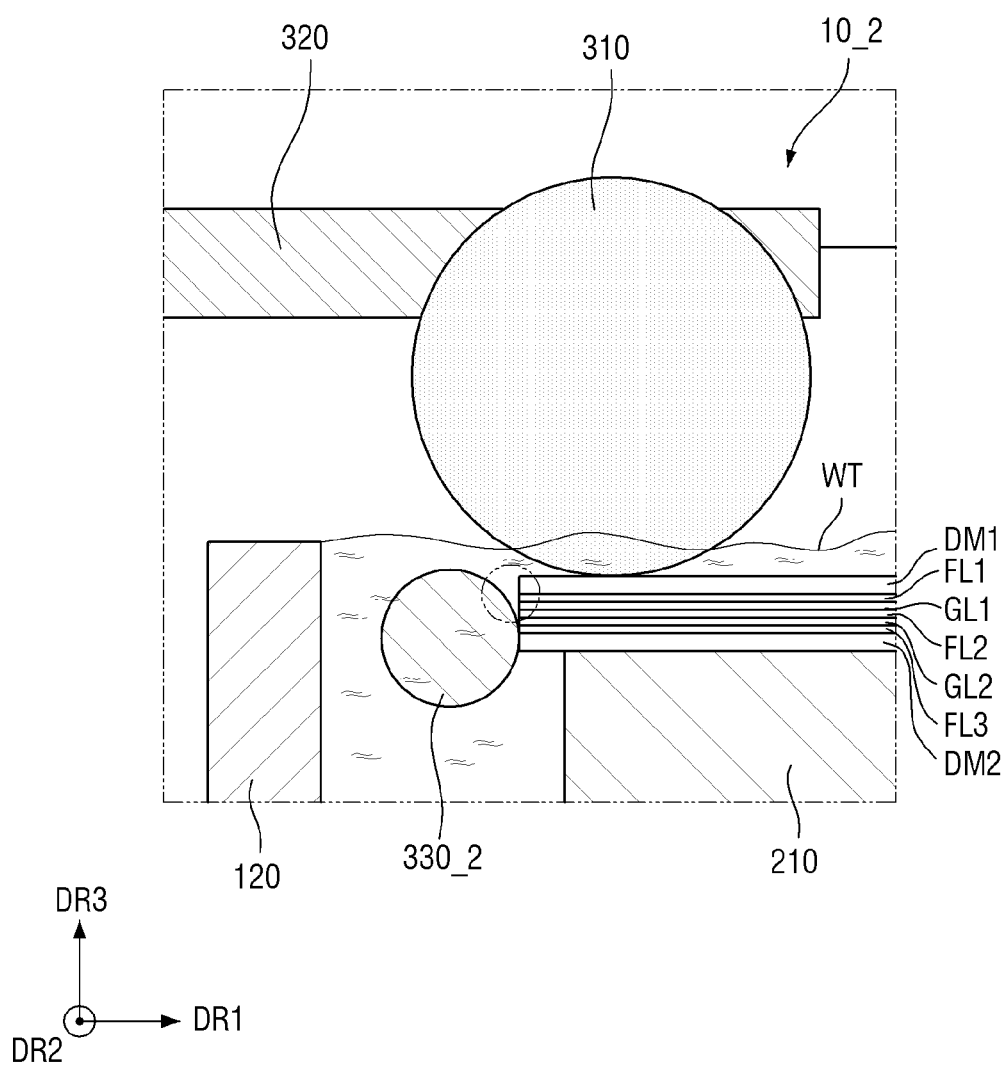
FIG. 20A is a cross-sectional view showing another exemplary embodiment of the periphery of a peeling member of a peeling apparatus and FIG. 20B is an enlarged view of a portion of FIG. 20A.
Figure 20B:
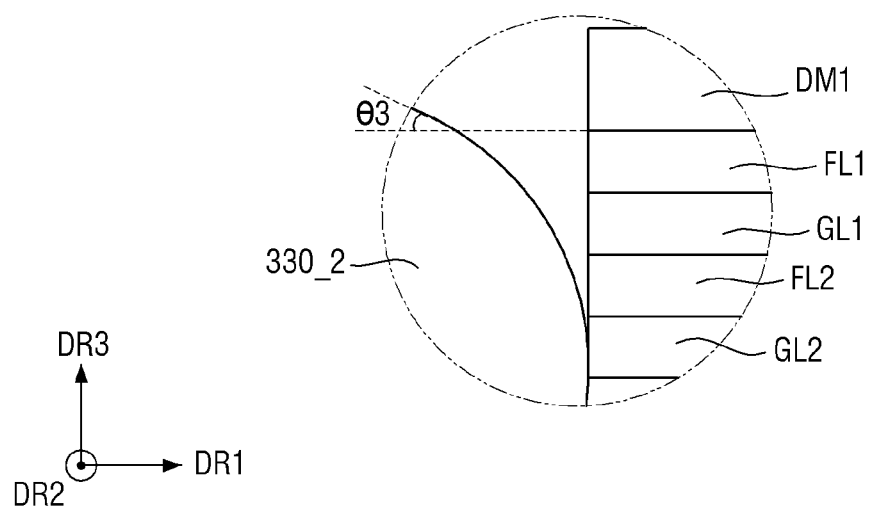

FIG. 20A is a cross-sectional view showing another exemplary embodiment of the periphery of a peeling member of a peeling apparatus and FIG. 20B is an enlarged view of a portion of FIG. 20A.

Referring to FIGS. 20A and 20B, a discharge preventing block 330_2 included in a peeling apparatus 10_2 according to the illustrated exemplary embodiment is different from the exemplary embodiment of FIG. 2 in that it does not include the base portion 331 and the tip portion 332, and is provided in a cylindrical shape.

Specifically, the peeling apparatus 10 according to the illustrated exemplary embodiment includes the discharge preventing block 330_2, and the discharge preventing block 330_2 does not include the base portion 331 and the tip portion 332, and may have a cylindrical shape or a roller shape extending in the second direction DR2. Thus, the discharge preventing block 330_2 according to the illustrated exemplary embodiment may have a circular shape in the cross-sectional view of FIG. 20A.

At a point where the surface of the discharge preventing block 330_2 and the imaginary plane extending from the lower surface of the first dummy DM1 meet each other, an acute angle θ3 between the above-mentioned surface and the imaginary plane may range from 1 degree to 30 degrees, or range from 10 degrees to 20 degrees.

Also in this case, as the peeling member 310 rotates, the stacked members of the target stack 20 may be automatically peeled off one by one, thereby ensuring the safety of the operator and improving the efficiency of the peeling process.

Figure 21:
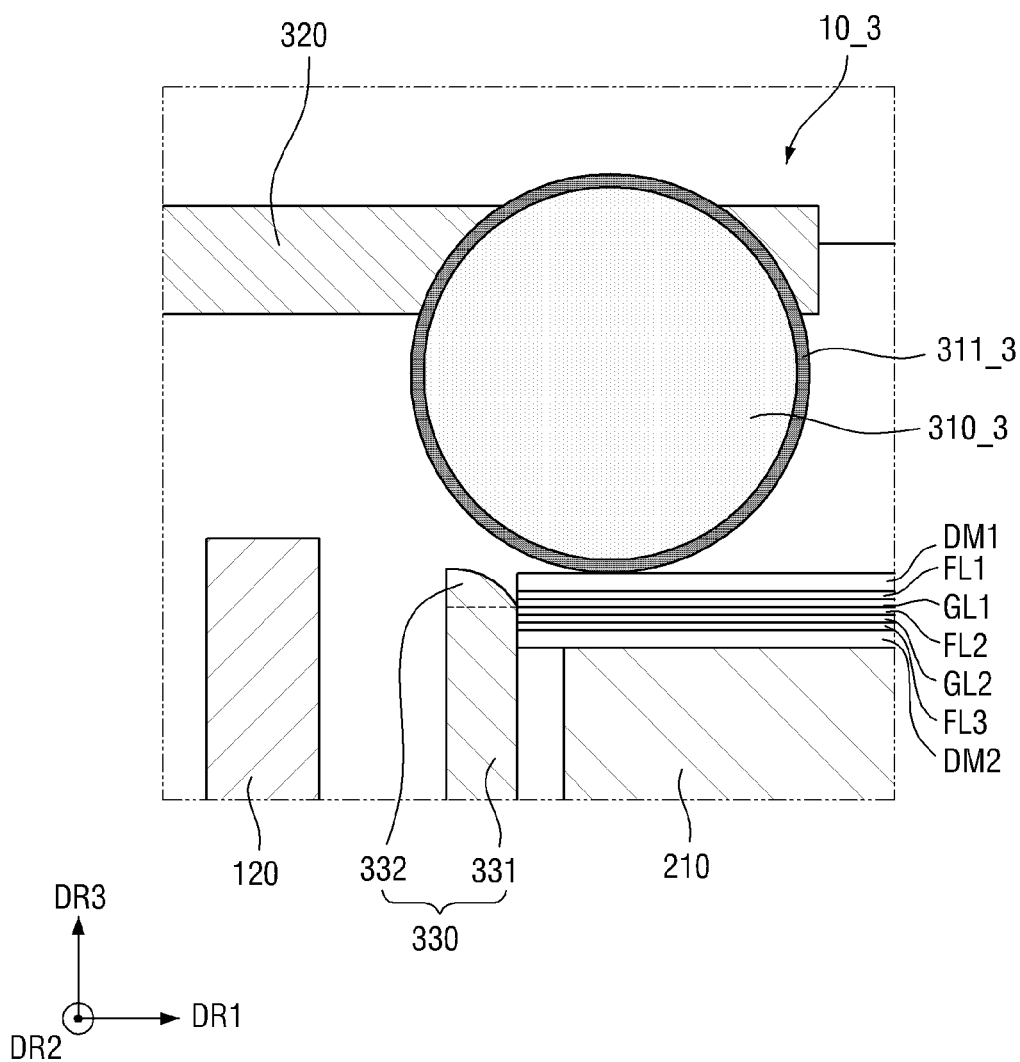
FIG. 21 is a cross-sectional view showing another exemplary embodiment of the periphery of a peeling member of a peeling apparatus.

FIG. 21 is a cross-sectional view showing another exemplary embodiment of the periphery of a peeling member of a peeling apparatus.

Referring to FIG. 21, a peeling member 310_3 included in a peeling apparatus 10_3 according to the illustrated exemplary embodiment is different from the exemplary embodiment of FIG. 2 in that a friction member 311_3 is attached to at least a portion of the surface of the peeling member 310_3.

Specifically, the peeling apparatus 10_3 according to the illustrated exemplary embodiment includes the peeling member 310_3, and the surface of the peeling member 310_3 includes rubber, but the friction member 311_3 may be attached to at least a portion of the surface of the peeling member 310_3. In this case, the friction member 311_3 may be attached to the surface of the peeling member 310_3 and may be in direct contact with each stacked member of the target stack 20. The friction member 311_3 may increase a frictional force between the peeling member 310_3 and the target stack 20. As the frictional force between the peeling member 310_3 and each stacked member of the target stack 20 increases, the peeling process by the rotation of the peeling member 310_3 may be performed more smoothly.

Also in this case, as the peeling member 310_3 rotates, the stacked members of the target stack 20 may be automatically peeled off one by one, thereby ensuring the safety of the operator and improving the efficiency of the peeling process.

Figure 22:
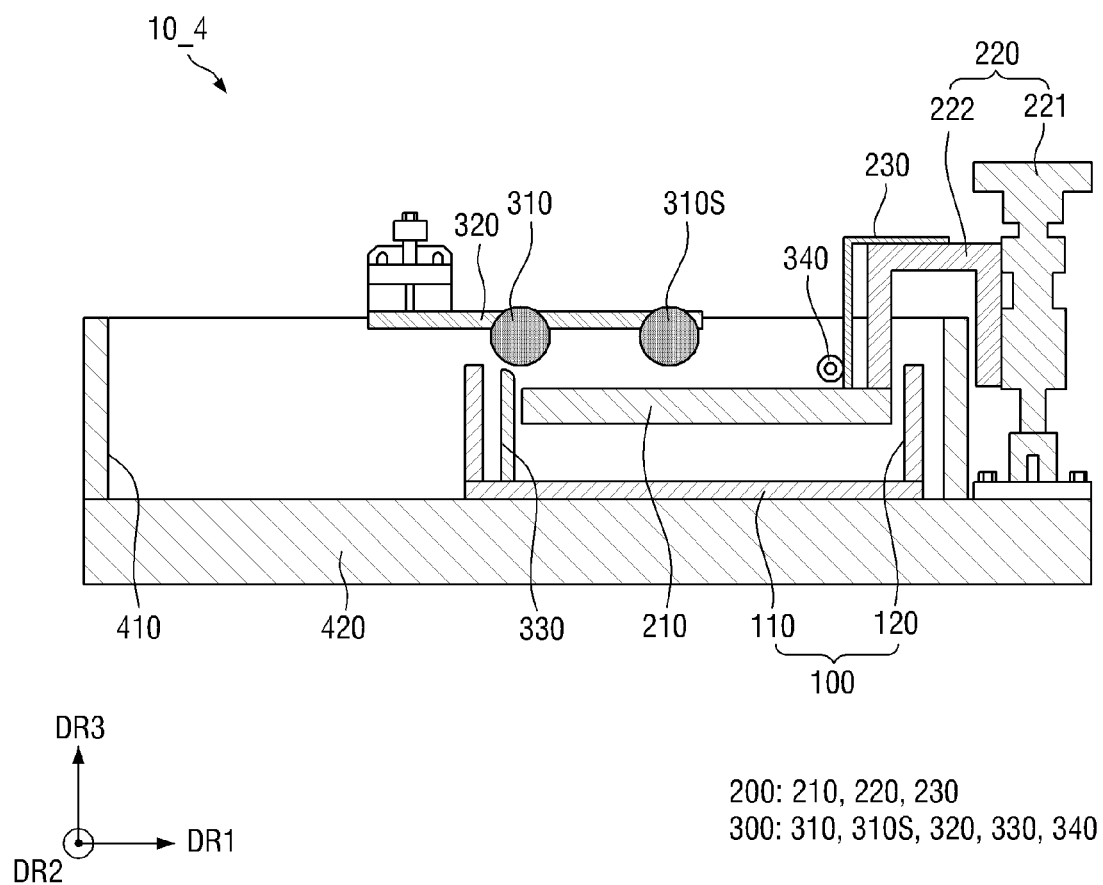
FIG. 22 is a cross-sectional view of another exemplary embodiment of a peeling apparatus.

FIG. 22 is a cross-sectional view of another exemplary embodiment of a peeling apparatus.

Referring to FIG. 22, a peeling apparatus 10_4 according to the illustrated exemplary embodiment is different from the exemplary embodiment of FIG. 2 in that it includes not only the peeling member 310 but also a sub-peeling member 310S.

Specifically, the peeling apparatus 10 according to the illustrated exemplary embodiment includes the peeling module 300, but the peeling module 300 may include a plurality of peeling members 310. That is, the peeling apparatus 10 according to the illustrated exemplary embodiment may include the peeling member 310 and the sub-peeling member 310S. The shape of the sub-peeling member 310S may be substantially the same as the shape of the peeling member 310.

The sub-peeling member 310S may be disposed on the stage 210 and may be disposed between the peeling member 310 and the centering unit 230. In addition, the sub-peeling member 310S may have the same height as the peeling member 310. That is, the height from the top surface of the stage 210 to the peeling member 310 may be the same as the height from the top surface of the stage 210 to the sub-peeling member 310S. In this case, as the target stack 20 disposed (e.g., mounted) on the stage 210 elevates, the stacked member disposed at the uppermost portion of the target stack 20 contacts the peeling member 310 and the sub-peeling member 310S. When a process of peeling the stacked member disposed at the uppermost portion of the target stack 20 is performed, the peeling process may be performed more smoothly by further including the sub-peeling member 310S.

Also in this case, as the peeling member 310 rotates, the stacked members of the target stack 20 may be automatically peeled off one by one, thereby ensuring the safety of the operator and improving the efficiency of the peeling process. In addition, as the peeling apparatus 10 further includes not only the peeling member 310 but also the sub-peeling member 310S, even when the peeling member 310 is damaged, the peeling process may be performed only by the sub-peeling member 310S. Therefore, the peeling process may be performed continuously and smoothly.

Figure 23:
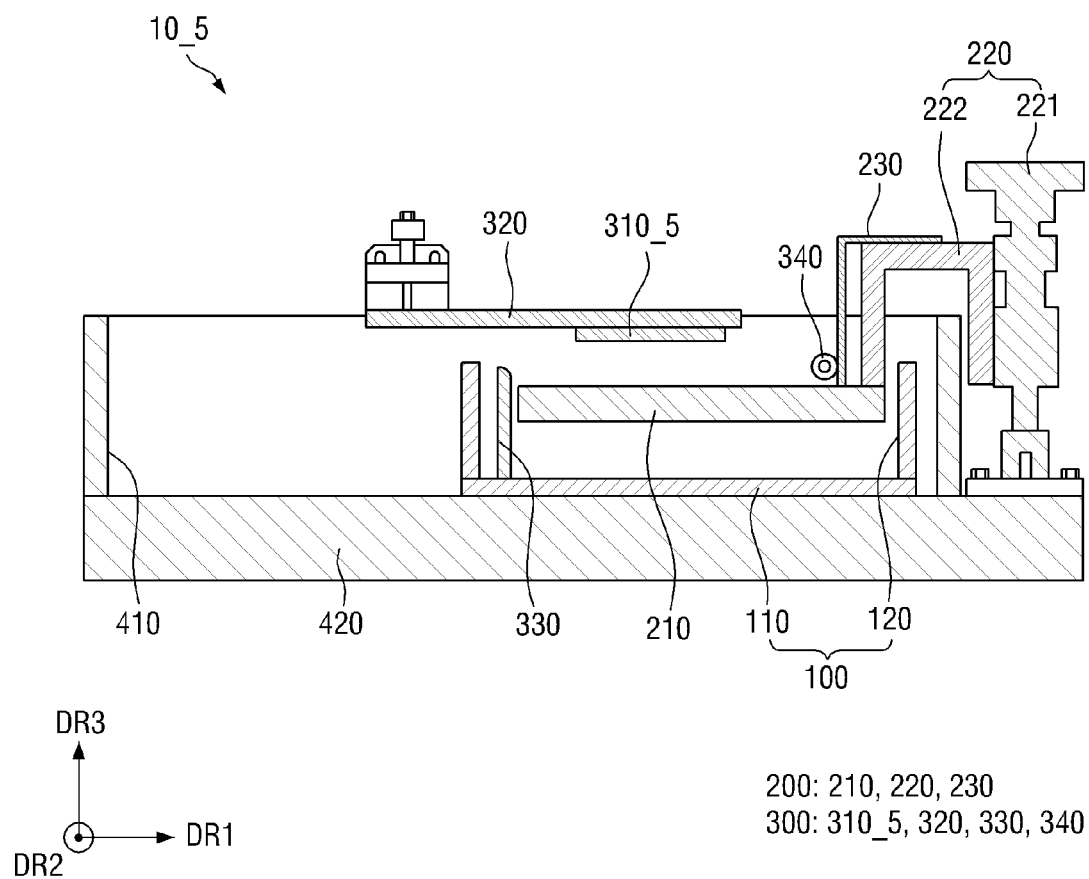
FIG. 23 is a cross-sectional view of another exemplary embodiment of a peeling apparatus.
Figure 24:
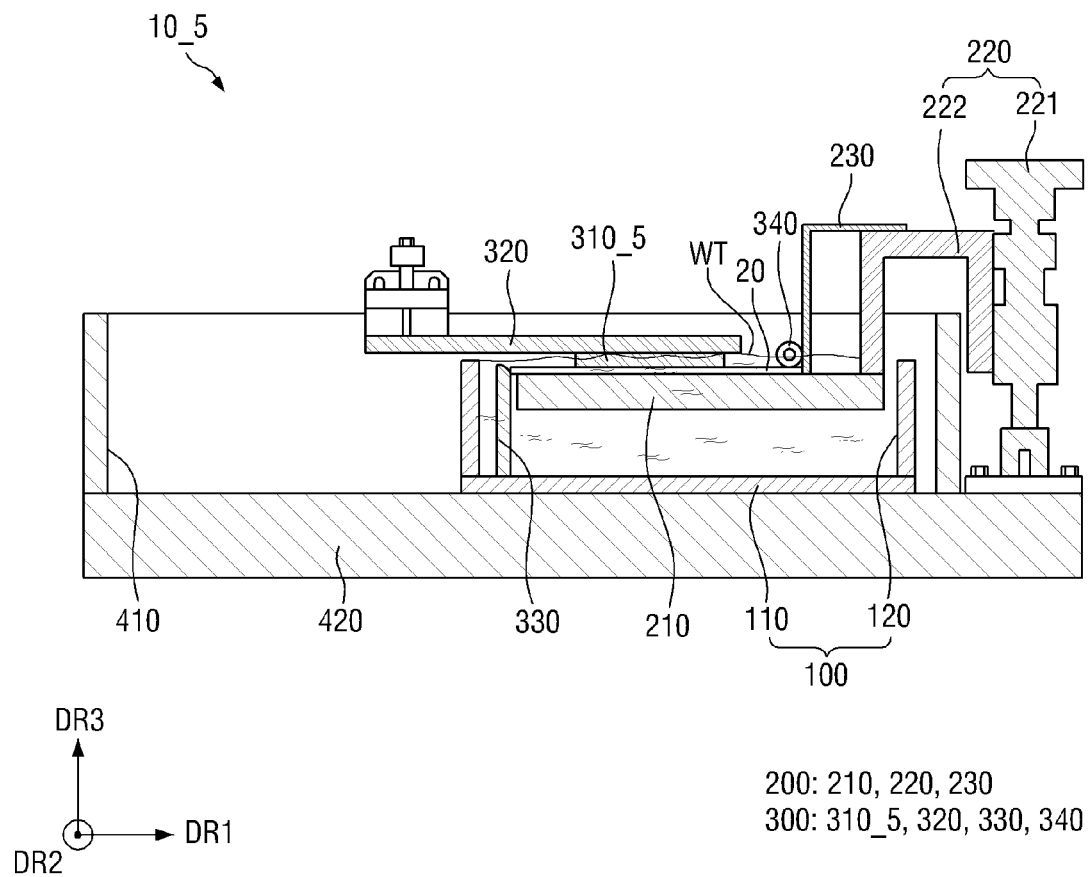
FIG. 24 is a cross-sectional view schematically showing how the stacked member is peeled off from the target stack by the peeling apparatus of FIG. 23.

FIG. 23 is a cross-sectional view of another exemplary embodiment of a peeling apparatus. FIG. 24 is a cross-sectional view schematically showing how the stacked member is peeled off from the target stack by the peeling apparatus of FIG. 23.

Referring to FIGS. 23 and 24, a peeling member 310_5 of a peeling apparatus 10_5 according to the illustrated exemplary embodiment is different from the exemplary embodiment of FIG. 2 in that the peeling member 310_5 has a plate shape rather than a roller shape.

Specifically, the peeling member 310_5 of the peeling apparatus 10_5 according to the illustrated exemplary embodiment is not provided in a roller shape, but may be provided in a plate shape. The peeling member 310_5 may be disposed above the stage 210 and may be connected to the peeling member support 320. The lower surface of the peeling member 310_5, i.e., the surface facing the stage 210 may include rubber. However, the peeling member 310_5 is not limited thereto, and for example, an adsorption member may be disposed below the peeling member 310_5 to adsorb the target stack 20.

The peeling member 310_5 may move up and down (in the third direction DR3). After the target stack 20 is disposed (e.g., mounted) on the stage 210, the peeling member 310_5 disposed on the stage 210 may move down to contact the target stack 20. Subsequently, as the peeling member 310_5 moves to one side of the first direction DR1, the stacked member disposed at the uppermost portion of the target stack 20 may move together with the peeling member 310_5 to be peeled off from the target stack 20.

Also in this case, as the peeling member 310_5 rotates, the stacked members of the target stack 20 may be automatically peeled off one by one, thereby ensuring the safety of the operator and improving the efficiency of the peeling process.

While the exemplary embodiments of the invention have been described with reference to the accompanying drawings, it will be understood by those skilled in the art that various modifications may be made without departing from the scope of the invention and without changing essential features. Therefore, the above-described embodiments should be considered in a descriptive sense only and not for purposes of limitation.

What is claimed is:

1. A peeling apparatus comprising:
   a water tank including a bottom surface and opposite outer walls being in contact with and extending from the bottom surface;
   a stage disposed in the water tank;
   a peeling member disposed above the stage; and
   a discharge preventing block disposed in the water tank, disposed outside the stage, extending from the bottom surface and interposed between the opposite outer walls,
   wherein a height of the discharge preventing block is greater than a height of the stage.

2. The peeling apparatus of claim 1, further comprising: water filled in the water tank.

3. The peeling apparatus of claim 2, wherein the stage, the discharge preventing block and a lower portion of the peeling member are immerged in the water.

4. The peeling apparatus of claim 1, wherein the peeling member is a roller which includes a surface covered with rubber.

5. The peeling apparatus of claim 4, wherein a height of a lowermost end of the peeling member is lower than a height of an uppermost end of the discharge preventing block.

6. The peeling apparatus of claim 4, wherein a frictional member is disposed on at least portion of the surface of the peeling member.

7. The peeling apparatus of claim 1, wherein the discharge preventing block includes a base portion having a uniform width and a tip portion connected to the base portion and having a width smaller than the width of the base portion.

8. The peeling apparatus of claim 7, wherein a width of the tip portion decreases toward an upper end thereof.

9. The peeling apparatus of claim 8, wherein an inner surface of the tip portion has a rounded shape.

10. The peeling apparatus of claim 1, further comprising:
    a sub-peeling member including a surface covered with rubber, the sub-peeling member being disposed above the stage, and a shape of the sub-peeling member is identical to a shape of the peeling member.

11. The peeling apparatus of claim 10, wherein the peeling member and the sub-peeling member have a same height.

12. A method of manufacturing a display device, the method comprising:
    disposing a target stack including a plurality of stacked glass members on a stage;
    elevating the stage on which the target stack is disposed; and
    peeling off a first glass member of the plurality of stacked glass members disposed at an uppermost portion of the target stack using a peeling member and a discharge preventing block,
    wherein the peeling the first glass member is performed in a water tank including a bottom surface and opposite outer walls being in contact with and extending from the bottom surface and filled with water, and
    the discharge preventing block is disposed in the water tank, is disposed outside the stage, extends from the bottom surface and is interposed between the opposite outer walls.

13. The method of claim 12, wherein in the peeling the first glass member, a temperature of the water ranges from 70 degrees Celsius to 90 degrees Celsius.

14. The method of claim 12, wherein the peeling the first glass member is performed while at least a portion of the peeling member, the stage and the target stack are immersed in the water.

15. The method of claim 12, further comprising: after the peeling the first glass member,
    elevating the stage on which the target stack, from which the first glass member has been peeled off, is disposed; and
    peeling off a second glass member of the plurality of stacked glass members disposed at an uppermost portion of the target stack from which the first glass member has been peeled off.

16. The method of claim 15, wherein the target stack further includes a film between the plurality of glass members, and
    the method further comprising, before the peeling the second glass member, peeling off the film from the target stack from which the first glass member has been peeled off.

17. The method of claim 12, wherein the peeling member is a roller, and
    wherein the elevating the stage is elevating the stage such that the first glass member of the target stack disposed on the stage is in direct contact with the peeling member.

18. The method of claim 17, wherein in the peeling the first glass member, the first glass member is peeled off by rotation of the peeling member.

19. The method of claim 17, wherein a surface of the peeling member is covered with rubber.

20. The method of claim 12, further comprising: before the peeling the first glass member,
    aligning the target stack,
    wherein in the aligning of the target stack, at a point where an imaginary plane extending from a lower surface of the first glass member and an inner surface of a discharge preventing block meet each other, an acute angle between the imaginary plane and the inner surface of the discharge preventing block ranges from 10 degrees to 20 degrees.

* * * * *